(12) United States Patent
Nakajima

(10) Patent No.: US 7,139,858 B2
(45) Date of Patent: Nov. 21, 2006

(54) SERVER FOR SYNCHRONIZATION CONTROL, CHANNEL DRIVER AND METHOD OF LINKING CHANNELS

(75) Inventor: Kazuaki Nakajima, Tokyo (JP)

(73) Assignee: NEC Corporation, Tokyo (JP)

( * ) Notice: Subject to any disclaimer, the term of this patent is extended or adjusted under 35 U.S.C. 154(b) by 398 days.

(21) Appl. No.: 10/284,228

(22) Filed: Oct. 30, 2002

(65) Prior Publication Data

US 2003/0084205 A1    May 1, 2003

(30) Foreign Application Priority Data

Oct. 30, 2001   (JP) ............................. 2001-332606

(51) Int. Cl.
*G06F 13/00*    (2006.01)
(52) U.S. Cl. ...................... 710/300; 709/231; 709/217; 725/93; 705/14
(58) Field of Classification Search ..................... None
See application file for complete search history.

(56) References Cited

U.S. PATENT DOCUMENTS

| | | | |
|---|---|---|---|
| 6,108,695 A * | 8/2000 | Chawla ....................... | 709/217 |
| 6,437,802 B1 * | 8/2002 | Kenny ........................ | 715/723 |
| 6,510,556 B1 * | 1/2003 | Kusaba et al. ................ | 725/93 |
| 6,792,469 B1 * | 9/2004 | Callahan et al. ............. | 709/231 |
| 2002/0069107 A1 * | 6/2002 | Werner ........................ | 705/14 |
| 2003/0037340 A1 * | 2/2003 | Devara et al. .............. | 725/110 |

FOREIGN PATENT DOCUMENTS

| | | |
|---|---|---|
| JP | 5-242208 | 9/1993 |
| JP | 11-88279 | 3/1999 |
| JP | 11-215193 | 8/1999 |

OTHER PUBLICATIONS

Hayasaka R. et al., "A Broadcasting Schedule Management Method Supporting Real-Time Change of Data Broadcasting Programs", (*DICOMO*) *Symposium Essays, Information Processing Society of Japan*, 571-576 (2000).
Sumiya K. et al., "Dynamic Video Production and Delivery from Indexed Live Video Stream", Journal of the Information Processing Society of Japan, *41(SIG1)*:87-99 (2000).

* cited by examiner

*Primary Examiner*—Lynne H. Browne
*Assistant Examiner*—Fahmida Rahman
(74) *Attorney, Agent, or Firm*—Scully, Scott, Murphy & Presser, P.C.

(57) ABSTRACT

A server for carrying out synchronization control, includes (a) at least one event receiver for receiving an event, (b) a memory storing therein distribution schedule information including a plurality of schedule data therein, each of the schedule data including (b1) a timing at which a channel driver controls a media server, (b2) a content of how the channel driver controls the media server, and (b3) a timing type indicating which one of a time and the event the timing is defined by, and (c) a controller which detects whether a timing is established for each of the schedule data included in the distribution schedule information, and transmits a signal to the channel driver, the signal being indicative of a control associated with the established timing.

29 Claims, 20 Drawing Sheets

FIG.18

| p.m.0:00 TO p.m.10:00 | DISPLAYING HTML PAGE T AT START |
| --- | --- |
| | TURNING TO HTML PAGE U AT END |

4321

| p.m.1:00 TO p.m.3:00 | STARTING DISTRIBUTING IMAGE Q AT START |
| --- | --- |
| | FINISHING DISTRIBUTING IMAGE Q AT END |
| | DISPLAYING HTML PAGE Q AT START |
| | FINISHING DISPLAYING HTML PAGE Q AT 3 MINUTES BEFORE END |

4322

| p.m.3:00 TO p.m.5:00 | STARTING DISTRIBUTING IMAGE R AT START |
| --- | --- |
| | FINISHING DISTRIBUTING IMAGE R AT END |
| | DISPLAYING HTML PAGE R AT START |
| | FINISHING DISPLAYING HTML PAGE R AT 3 MINUTES BEFORE END |

4323

| p.m.2:00 TO p.m.3:00 OR UNTIL ISSUANCE OF EVENT E | DISPLAYING QUESTIONNAIRE AT START |
| --- | --- |
| | FINISHING QUESTIONNAIRE AT END |

4324

| AT ISSUANCE OF EVENT F AND AT p.m.5:00 | STARTING DISTRIBUTING IMAGE S AT THE TIMING |
| --- | --- |

4325

SERVER FOR SYNCHRONIZATION CONTROL, CHANNEL DRIVER AND METHOD OF LINKING CHANNELS

BACKGROUND OF THE INVENTION

1. Field of the Invention

The invention relates to a system for distributing multimedia contents such as image signals, audio signals or HTML pages to clients from a media server, and more particularly to administration of distribution schedule.

2. Description of the Related Art

Administration of distribution schedule is grouped into two groups.

In one of the groups, as suggested in Japanese Unexamined Patent Publication No. 11-215193 (A), a client has schedule information in order to control an order in reproducing contents provided from a plurality of servers.

In the other, as suggested in Japanese Unexamined Patent Publication No. 11-88279 (A), a host server connected to a plurality of servers through a network has schedule information in order to administrate the schedule information.

The present invention relates to schedule administration accomplished by a content transmitter like Japanese Unexamined Patent Publication No. 11-88279 (A).

FIG. 1 is a block diagram of a broadcasting system suggested in Japanese Unexamined Patent Publication No. 11-88279 (A).

In the illustrated broadcasting system, an index server 21 of a distributor, a plurality of information servers 25A to 25D, and a plurality of client terminals 29A and 29B are connected to one another for communication through a network 23.

The index server 21 stores broadcasting schedules 31A and 31B defining a plurality of programs to be broadcast, and a time at which the programs are broadcast for broadcasting channels CH1 and CH2 provided by the distributor, respectively.

Each of the information servers 25A to 25D stores files 33A to 33F of broadcast contents fabricated by content providers.

The index server 21 requests the information servers 25A to 25D having broadcast contents, to broadcast each of the programs at a designated time through a channel in accordance with the broadcasting schedules 31A and 31B of the channels CH1 and CH2.

Specifically, the index server 21 transmits a command indicating that a certain program has to start being broadcasted at a certain time at a certain channel, or that a certain program has to start being broadcasted immediately, and a command indicating that a certain program has to end at a certain time, or that a certain program has to end immediately, to each of the information servers 25A to 25D.

In compliance with a request transmitted from the index server 21, each of the information servers 25A to 25D transmits data stored in the files 33A to 33F, to a designated channel in the network 23 at a designated time. Specifically, when each of the information servers 25A to 25D receives a command to start a program, each of the information servers 25A to 25D reads content data relating to a target program out of the files 33A to 33F, and starts the program at a designated time in a designated channel, in compliance with the command. When each of the information servers 25A to 25D receives a command to end a program, each of the information servers 25A to 25D ends a target program at a designated time in compliance with the command.

Due to the above-mentioned operations of the index server 21 and the information servers 25A to 25D, there are formed multi-media data streams 35A and 35B in the network 23. Each of the multi-media data streams 35A and 35B is comprised of broadcast contents made in accordance with the broadcast schedules 31A and 31B for each of the channels CH1 and CH2, and combined with one another.

The broadcasting system illustrated in FIG. 1 administrates the distribution schedule with a time. Such administration of the distribution schedule is identical with the same having been conventionally conducted in TV broadcasting studio, for instance, and is effective for a service of distributing data stream to a client from a server.

However, it would be necessary to in advance determine a time at which each of contents is to be distributed, in order to administrate a schedule only with a time. In other words, it would not be possible to schedule a content, if a time at which the content is to be distributed is not in advance determined.

For instance, when an event occurs while images or sounds are being distributed, and accordingly, it is desired to switch those images or sounds into other images or sounds, or it is desired to distribute other data together with those images or sounds, the broadcasting system illustrated in FIG. 1 cannot schedule such switching or distribution, if a time at which the event occurs cannot be known in advance.

In these days, there are provided contents in a new distribution form, such as an interactive service system providing a program in which TV broadcasting and a home-page in Internet are linked with each other to thereby make it possible for users to take part in.

In such an interactive service system, when a schedule is to be changed in accordance with results of a questionnaire carried out to users at real-time, it would be almost impossible to administrate a schedule only with a time, since it is not possible to know by what time replies to the questionnaire can be collected, and/or a result of the questionnaire.

It would be possible to administrate a schedule with a time by rewriting schedule data when an event occurs, as usually done in a TV broadcasting studio. However, since it would require much work and take much time to rewrite schedule data, it would be quite difficult or almost impossible to rapidly change a schedule.

Japanese Unexamined Patent Publication No. 5-242208 has suggested a system for revising a multi-media scenario, in which a scenario is described with a network, based on synchronization data obtained at points at which medias are synchronized with one another, and a period of time during which a media is suggested is adjusted by automatically detecting a portion to be adjusted in the scenario.

However, the above-mentioned problems remain unsolved even in the Publication.

SUMMARY OF THE INVENTION

In view of the above-mentioned problems, it is an object of the present invention to provide a system for administrating a distribution schedule with not only a time, but also an event.

In one aspect of the present invention, there is provided a server for carrying out synchronization control, including (a) at least one event receiver for receiving an event, (b) a memory storing therein distribution schedule information including a plurality of schedule data therein, each of the schedule data including (b1) a timing at which a channel driver controls a media server, (b2) a content of how the channel driver controls the media server, and (b3) a timing type indicating which one of a time and the event the timing is defined by, and (c) a controller which detects whether a timing is established for each of the schedule data included in the distribution schedule information, and transmits a signal to the channel driver, the signal being indicative of a control associated with the established timing.

There is further provided a server for carrying out synchronization control, including (a) at least one event receiver for receiving an event, (b) a memory storing therein distribution schedule information including a plurality of schedule data therein, each of the schedule data including (b1) a timing at which a channel driver controls a media server, (b2) a content of how the channel driver controls the media server, and (b3) a timing type indicating which one of a time, the event, and establishment of a timing in other schedules the timing is defined by, and (c) a controller which detects whether a timing is established for each of the schedule data included in the distribution schedule information, and transmits a signal to the channel driver, the signal being indicative of a control associated with the established timing.

In the server in accordance with the present invention, each of the schedule data includes a timing at which a channel driver controls a media server, a content of how the channel driver controls the media server, and a timing type indicating which one of a time and the event the timing is defined by, and whether a timing is established for each of the schedule data included in the distribution schedule information is detected in accordance with the timing type. Accordingly, a distribution schedule can be made, based on not only a time, but also an event and other schedules.

For instance, each of the schedule data may include at least one timing-describing section including data indicative of a timing at which the channel driver controls the media server, and at least one command-describing section including data indicating the content of how the channel driver controls the media server. The timing-describing section includes a timing type section indicative of which one of a time and an event a timing is defined by, and a timing data section including, if a timing is defined by a time, the time, or if a timing is defined by an event, conditions in accordance with which the timing is established.

For instance, the controller may include (c1) a first timing-controller which detects whether a timing is established in the timing-describing section indicating that a timing is defined by a time, (c2) a second timing-controller which detects whether a timing is established in the timing-describing section indicating that a timing is defined by an event, and (c3) a distribution controller which produces a signal in accordance with a command-describing section associated with a timing-describing section indicating that a timing has been established and which is stored in a queue, and transmits the signal to the channel driver through a network.

The timing-describing section may include an operation-point item indicative of a start of a schedule, an end of a schedule or a timing at which an action is to be carried out, the command-describing section may include an action-point item indicative of a start of a schedule, an end of a schedule or a timing at which an action is to be carried out, and the controller may process all of command-describing sections including the action-point item having the same content as that of the operation-point item of the timing-describing section indicating that a timing has been established, among command-describing sections included in schedule data, when a timing is established in a timing-describing section in the schedule data.

If a timing is established in a certain schedule, a plurality of commands can be carried out to thereby simultaneously transmit signals to a plurality of channels. As a result, channels can be linked to one another. Hence, for instance, a content transmitted through a plurality of channels can be changed simultaneously.

The timing-describing section may include an item for determining a first delay time by which establishment of a timing is delayed.

As a result, it will be possible to apply a delay time at a time to all of the command-describing sections including an action-point item having the same content as that of an operation-point item of the timing-describing section.

The command-describing section may include an item for determining a second delay time by which production of the signal is delayed.

If a timing is established in a certain schedule, a plurality of commands can be carried out to thereby transmit signals indicative of different times from one another, to a plurality of channels. As a result, channels can be linked to one another. Hence, for instance, a content transmitted through a plurality of channels can be changed with a time lag.

Since the synchronization control server and the channel driver are connected to each other through a network such as Internet, it is necessary to transmit a signal to the channel driver in advance in order for the channel driver to carry out a control at a designated time in accordance with the signal. To this end, it is preferable that the controller (a) adds the second delay time to a time at which a timing is established, (b) applies a first time resulted from the addition to a command-describing section associated with a timing-describing section indicating that a timing has been established, and (c) stores the command-describing section in the queue, and the distribution controller transmits a signal to the channel driver at a certain time before the first time having been applied to the command-describing section, the signal being indicative of the first time.

The structures of the controller and the distribution controller make it possible to in advance transmit a signal to carry out a schedule defined with an event or a schedule linking with other schedules.

The distribution controller may be designed to apply an identifier to the signal for identifying the signal only, and, when instructed of termination, interruption or restart of schedule, transmit a command indicative of termination, interruption or restart of the signal to the channel driver by designating the identifier of the signal.

Thus, it is possible to terminate, interrupt or restart a schedule.

The conditions may be comprised of an equation for evaluating variables which are one of factors by which a timing is established, the equation including variables which are varied by a predetermined equation for operating variables, when the event occurs.

Herein, the equation for evaluating variables indicates an equation including variables which are varied in accordance with a predetermined equation when a predetermined event occurs. By comprising the conditions of the above-mentioned equation, it would be possible to make a schedule for the channel driver to control the media-server, for instance, when an event occurred at a plurality of times, or when a plurality of events occurred at a certain number of times.

The memory may store (a) variable data including a title of the variables, an initial value, and a variation value, and (b) event-processing data including an identifier of an event and an equation for operating variables, and the event receiver may carry out the equation for operating variable in the event-processing data having an identifier identical with an identifier of a received event, to thereby update the variation value in the variable data.

The memory may store variable data including a title of the variables, an initial value, and a variation value, and the distribution schedule information may include schedule data having a command-describing section describing an equation for operating variables to update a variation value of the variable data. The server may further include a command-processor which carries out a command-describing section describing the equation for operating variables, in response to establishment of a timing in a timing-describing section associated with the command-describing section.

Thus, a variable can be varied by not an externally received event, but a schedule determined in advance, to thereby carry out a schedule defined with the event.

The signal may indicate a time at which the channel driver has to carry out a control, and abstract data identifying the control, and the channel driver may carry out an application identified by the abstract data at the time for controlling the media server.

Thus, it is possible to separate data to control the media server by the channel driver, from a protocol of the signal and basic operation of the synchronization control server, resulting in that the media server can be controlled in different ways.

For instance, the abstract data may be comprised of a signal identifier and an argument. The event receiver may be designed to receive at least one of an identifier of an event which occurred at a user interface and an identifier of an event which occurred at an external system.

Thus, it is now possible to carry out a schedule in accordance with an event which a system administrator inputs, or an event input from an external system connected to the synchronization control server.

The event receiver may receive an identifier of an event which occurred at the media server.

Thus, it will be possible to carry out a schedule which controls other channels, when there occurs an event resulted from what the media server has carried out.

There is further provided a server for carrying out synchronization control, including (a) at least one event receiver for receiving an event, (b) a memory storing therein distribution schedule information including a plurality of schedule data therein, each of the schedule data including (b1) a timing at which a channel driver controls a media server, (b2) a content of how the channel driver controls the media server, and (b3) a timing type indicating which one of a time, the event, and establishment of a timing in other schedules the timing is defined by, and (c) a controller which detects whether a timing is established for each of the schedule data included in the distribution schedule information, and transmits a signal to the channel driver, the signal being indicative of a control associated with the established timing.

In the server in accordance with the present invention, each of the schedule data includes a timing at which a channel driver controls a media server, a content of how the channel driver controls the media server, and a timing type indicating which one of a time, the event, and establishment of a timing in other schedules the timing is defined by, and whether a timing is established for each of the schedule data included in the distribution schedule information is detected in accordance with the timing type. Accordingly, a distribution schedule can be made, based on not only a time, but also an event and other schedules.

Each of the schedule data may include at least one timing-describing section including data indicative of a timing at which the channel driver controls the media server, and at least one command-describing section including data indicating the content of how the channel driver controls the media server. The timing-describing section includes a timing type section indicative of which one of a time, an event, and establishment of a timing in other timing-describing section a timing is defined by, and a timing data section including, if a timing is defined by a time, the time, if a timing is defined by an event, conditions in accordance with which the timing is established, or if a timing is defined by establishment of a timing in other timing-describing section, data identifying the other timing-describing section.

The controller may include (c1) a first timing controller which detects whether a timing is established in the timing-describing section indicating that a timing is defined by a time, (c2) a second timing-controller which detects whether a timing is established in the timing-describing section indicating that a timing is defined by an event, (c3) a third timing-controller which detects whether a timing is established in the timing-describing section indicating that a timing is defined by establishment of a timing in other timing-describing section, and (c4) a distribution controller which produces a signal in accordance with a command-describing section associated with a timing-describing section indicating that a timing has been established and which is stored in a queue, and transmits the signal to the channel driver through a network.

In another aspect of the present invention, there is provided a channel driver including (a) a memory storing a signal transmitted from a synchronization control server through a network, the synchronization control server controlling an operation of each of a plurality of media servers which distribute contents in accordance with distribution schedule information including schedule data defining a control timing with a time or an event, the signal including a control carried out by the media servers, a time at which the media servers carry out the control, and identifiers identifying the media servers, and (b) a driver which detects a signal indicating that it is time to start the control, and causes a media server controller to carry out a control in accordance with the detected signal.

The driver, on receipt of a command of terminating or interrupting a signal identified with a designated identifier, from the synchronization control server through a network, may terminate or interrupt a signal identified with the designated identifier.

The driver, on receipt of a command of restarting a signal identified with an identifier and indicative of a delay time from the synchronization control server through a network after receiving a command of interrupting the signal from the synchronization control server, may release interruption of the signal with delaying a time at which the signal is to be carried out, by the delay time.

The channel driver may further include a communication unit which transmits an event identifier identifying an event which occurred in the media servers, to the synchronization control server through a network.

In still another aspect of the present invention, there is provided a program for causing a computer to act as the above-mentioned server for carrying out synchronization control.

In yet another aspect of the present invention, there is provided a method of linking channels in distribution of contents from a plurality of media servers to clients through separate channels, including the steps of (a) detecting whether a timing is established in each of timing types in each of a plurality of schedule data included in distribution schedule information, each of the schedule data including (a1) a timing at which each of the media servers is controlled, (a2) a content of how each of the media drivers is controlled, (a3) a channel to be controlled, and (a4) a timing type indicating which one of a time and an event the timing is defined by, and (b) transmitting a signal indicative of a control associated with an established timing, to a channel driver which controls a media server associated with the channel to be controlled.

There is further provided a method of linking channels in distribution of contents from a plurality of media servers to clients through separate channels, including the steps of (a) detecting whether a timing is established in each of timing types in each of a plurality of schedule data included in distribution schedule information, each of the schedule data including (a1) a timing at which each of the media servers is controlled, (a2) a content of how each of the media drivers is controlled, (a3) a channel to be controlled, and (a4) a timing type indicating which one of a time, an event, and establishment of a timing in other schedules the timing is defined by, and (b) transmitting a signal indicative of a control associated with an established timing, to a channel driver which controls a media server associated with the channel to be controlled.

The advantages obtained by the aforementioned present invention will be described hereinbelow.

In accordance with the present invention, it is now possible to make a distribution schedule, based on not only a time, but also an event, resulting in that channel can be readily linked with one another.

The above and other objects and advantageous features of the present invention will be made apparent from the following description made with reference to the accompanying drawings, in which like reference characters designate the same or similar parts throughout the drawings.

BRIEF DESCRIPTION OF THE DRAWINGS

FIG. 18 illustrates an example of schedule data in the fifth example.

DESCRIPTION OF THE PREFERRED EMBODIMENTS

Preferred embodiments in accordance with the present invention will be explained hereinbelow with reference to drawings.

Figure 1:
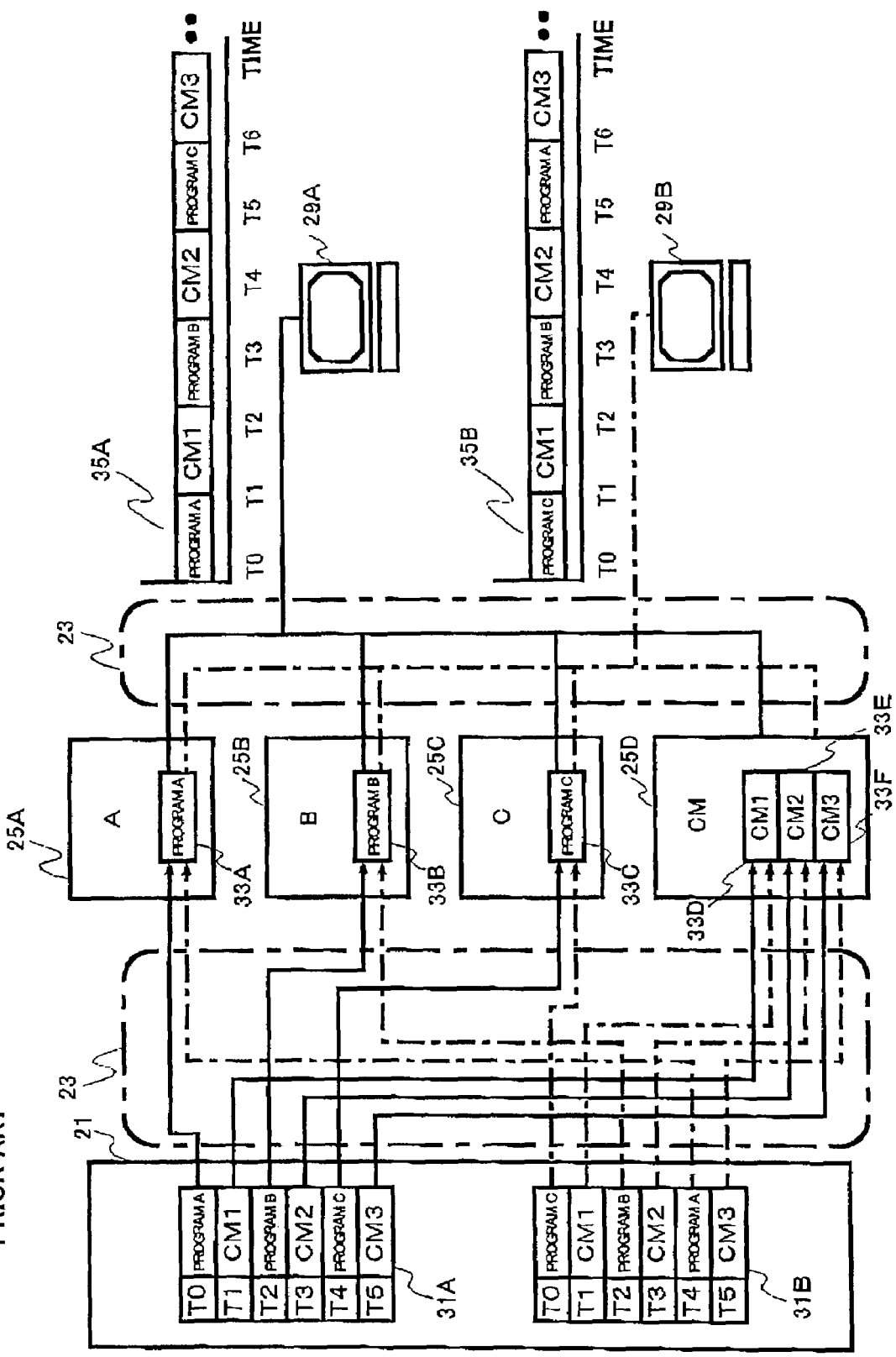
FIG. 1 is a block diagram of the conventional broadcasting system.
Figure 2:
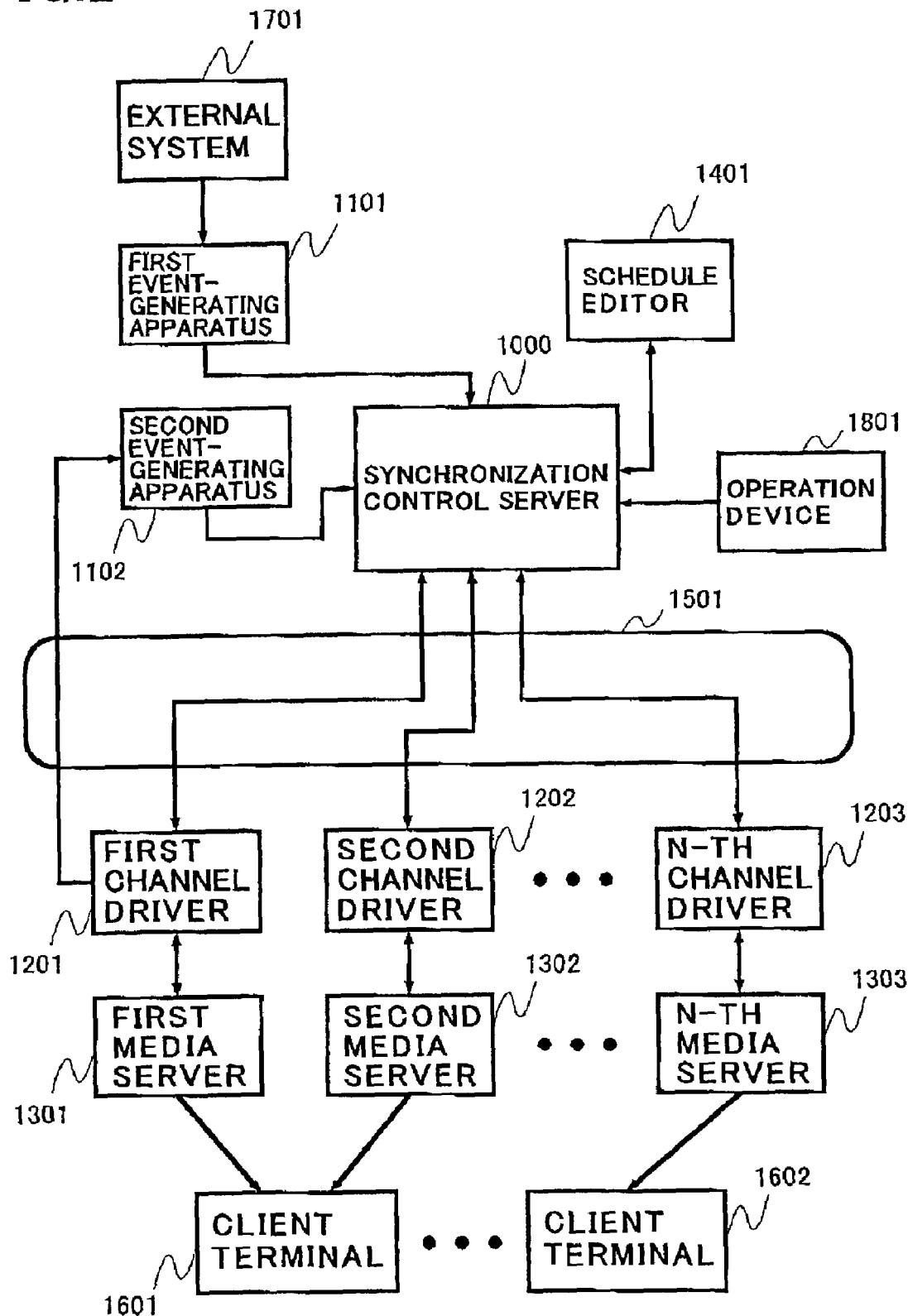
FIG. 2 is a block diagram of a broadcasting system in accordance with the first embodiment of the present invention.

FIG. 2 is a block diagram of a broadcasting system in accordance with the first embodiment of the present invention.

The illustrated broadcasting system is comprised of a synchronization control server 1000, a first event-generating apparatus 1101 providing an event to the synchronization control server 1000, a second event-generating apparatus 1102 providing an event to the synchronization control server 1000, a schedule editor 1401 providing a schedule to the synchronization control server 1000, an operation device 1801, first to N-th channel drivers 1201 to 1203 making interactive communication with the synchronization control server 1000 through a network 1501 wherein N is an integer equal to or greater than three, first to N-th media servers 1301 to 1303 making interactive communication to the first to N-th channel drivers 1201 to 1203, respectively, and a plurality of client terminals 1601 to 1602 receiving data from the first to N-th media servers 1301 to 1303.

The synchronization control server 1000 makes communication with the first event-generating apparatus 1101, the second event-generating apparatus 1102, the schedule editor 1401, and the operation device 1801.

The first to N-th media servers 1301 to 1303 distribute various media contents such as images, sounds and/or HTML pages to the client terminals 1601 to 1602 through radios or a network (not illustrated) such as Internet through separate channels from one another. The first to N-th media servers 1301 to 1303 are geographically located away from one another, and are controlled by the first to N-th channel drivers 1201 to 1203 located in the vicinity of the first to N-th media servers 1301, respectively. The channel drivers 1201 to 1203 are designed to make interactive communication with the synchronization control server 1000 through the network 1501.

Each of the first to N-th channel drivers 1201 to 1203 is designed to control the associated media server 1301 to 1303 in the illustrated broadcasting system. However, it should be noted that a channel driver may be designed to control a plurality of media servers, or that a media server is controlled by a plurality of channel drivers.

The synchronization control server 1000 transmits a signal to the first to N-th channel drivers 1201 to 1203 in accordance with distribution schedule information edited by the schedule editor 1401, to thereby control the first to N-th channel drivers 1201 to 1203. As a result, the synchronization control server 1000 controls distribution of contents to the client terminals 1601 to 1602 from each of the first to N-th media servers 1301 to 1303.

The distribution schedule information edited by the schedule editor 1401 includes control data indicative of a timing which is defined with a time and at which the first to N-th channel drivers 1201 to 1203 are controlled by the first to N-th media servers 1301 to 1303, control data which is defined with an event and at which the first to N-th channel drivers 1201 to 1203 are controlled by the first to N-th media servers 1301 to 1303, and control data which is defined with establishment of a timing in other control data and at which the first to N-th channel drivers 1201 to 1203 are controlled by the first to N-th media servers 1301 to 1303. Thus, a schedule can be administrated with not only a time, but also an event or other schedules.

The first and second event-generating apparatuses 1101 and 1102 transmit an event identifier which identifies an event used for starting a schedule, to the synchronization control server 1000.

The first event-generating apparatus 1101 includes user Internet, and is connected to the external system 1701. The first event-generating apparatus 1101 produces an event identifier associated with a type of an event which at least one of the user Internet and the external system 1701 occurs, and transmits the thus produced event identifier to the synchronization control server 1000.

The external system 1701 is comprised of any arbitrary system such as an automation system.

The second event-generating apparatus 1102 produces an event identifier associated with a type of an event which occurred in a particular media server, for instance, the first media server 1301 in the first embodiment, and was transmitted thereto through the first channel driver 1201 which controls the first media server 1301.

Both of the first and second event-generating apparatuses 1101 and 1102 include a table showing correspondence between a type of an event and an event identifier, and transmit an event identifier associated with a type of an event which occurred, to the synchronization control server 1000.

In the broadcasting system in accordance with the first embodiment, a signal indicative of a control to be carried out by the first to N-th channel drivers 1201 to 1203 and a time at which the control is to be carried out is transmitted to the first to N-th channel drivers 1201 to 1203 from the synchronization control server 1000 in advance of the time at which the control is to be carried out. Thus, it is possible to carry out a control to the first to N-th channel drivers 1201 to 1203 at a desired time without being influenced by a delay time in the network 1501 between the synchronization control server 1000 and the first to N-th channel drivers 1201 to 1203. The signals transmitted to the first to N-th channel drivers 1201 to 1203 in advance of the above-mentioned time are accumulated in the first to N-th channel drivers 1201 to 1203 without being carried out. Accordingly, the broadcasting system in accordance with the first embodiment can terminate, interrupt or restart the signals transmitted to the first to N-th channel drivers 1201 to 1203 in advance of the above-mentioned time.

The operation device 1801 acts as an interface between the synchronization control server 1000 and a system administrator. A system administrator provided commands to terminate, interrupt or restart the signals transmitted to the first to N-th channel drivers 1201 to 1203 in advance of the above-mentioned time, to the synchronization control server 1000 through the operation device 1801.

In the first embodiment, a flow of contents provided to the first to N-th media servers 1301 to 1303 to the client terminals 1601 to 1602 forms a channel. The synchronization control server 1000 controls the first to N-th channel drivers 1201 to 1203 in accordance not with distribution schedule made separately for each of the first to N-th channel drivers 1201 to 1203, but with distribution schedule information including schedules of the first to N-th channel drivers 1201 to 1203.

Thus, a channel linkage is accomplished. Herein, a channel linkage indicates a linkage of images and/or sounds broadcast on a television program with a content provided in a web site on Internet. For instance, a channel linkage means that a content broadcast in a television program is automatically provided to a net stream some minutes later, or a channel linkage may be formed as a program in which a television program and a web page are linked to each other at real-time to thereby make it possible for audience to take part in the program.

The client terminal 1601 illustrated in FIG. 2 simultaneously receives a plurality of channels which are in a channel linkage condition. On the other hand, the client terminal 1602 receives only one his/her favorite channel.

Hereinbelow is explained the distribution schedule information edited by the schedule editor 1401.

Figure 3:
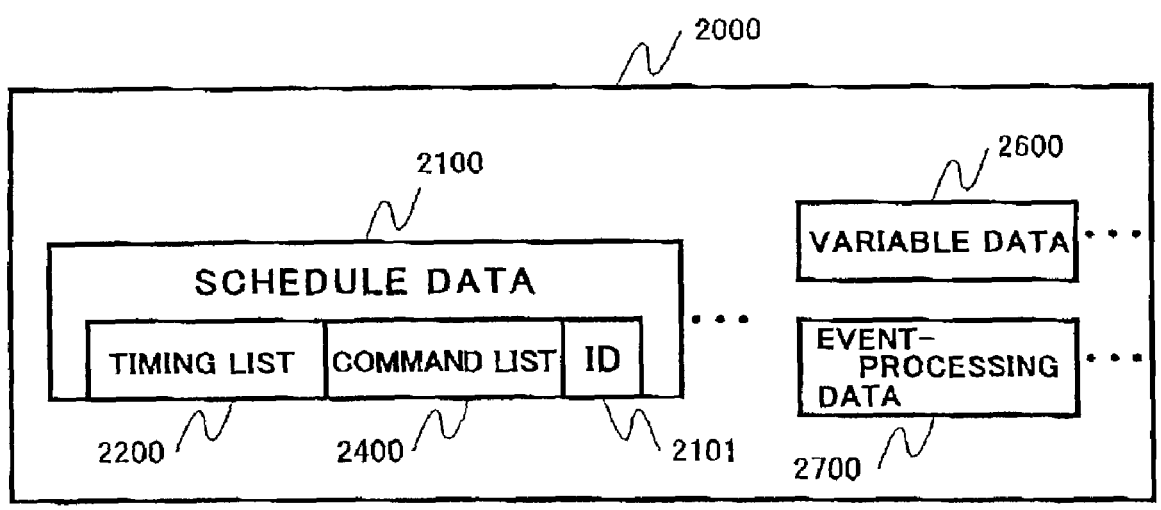
FIG. 3 illustrates an example of a structure of a schedule holder in the first embodiment.

FIG. 3 illustrates a logic structure of a schedule holder constituting distribution schedule information, made by a system administrator through the schedule editor 1401.

A schedule holder 2000 is comprised of a file, and includes at least one schedule data 2100, at least one variable data 2600, and at least one event-processing data 2700.

The schedule data 2100 is comprised of a list indicating which schedule is to be carried out and when the schedule is to be carried out. An item "when the schedule is to be carried out" may be defined with not only a time, but also an event or establishment of other schedules.

The variable data 2600 and the event-processing data 2700 are used for making a schedule defined with an event. As mentioned later the schedule data 2100 defined with an event includes an equation for evaluating variables. The equation is one of factors by which a timing is established. The equation is used for evaluating variables which are varied in accordance with a predetermined equation for calculating variables, when a predetermined event occurs. The variable data 2600 determines which variable is to be used, and the event-processing data 2700 determines which variable-calculating equation is to be used for varying variables when a predetermined event occurs.

Figure 4A:
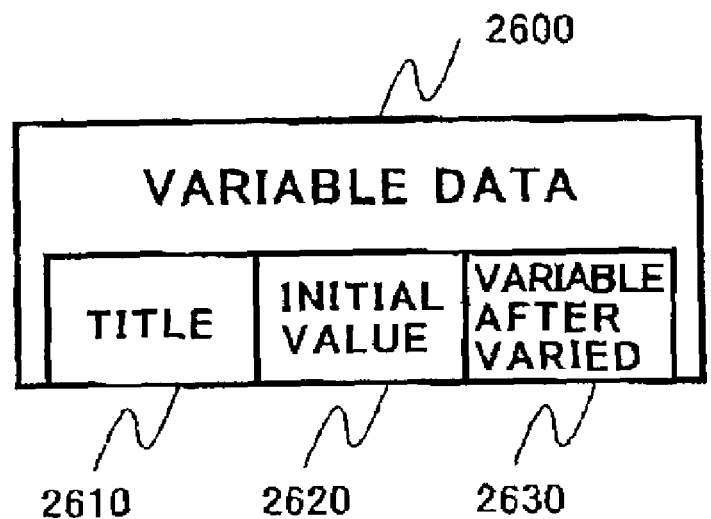
FIG. 4A illustrates an example of a structure of variable data in the first embodiment.
Figure 4B:
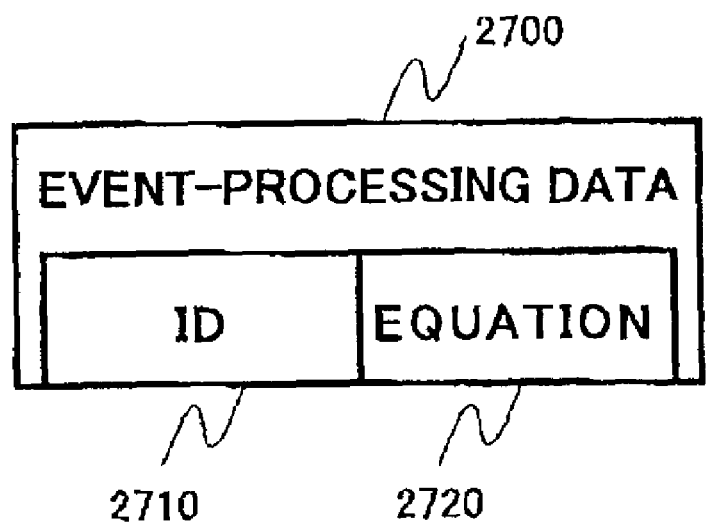
FIG. 4B illustrates an example of a structure of event processing data in the first embodiment.

FIG. 4A illustrates an example of a logic structure of the variable data 2600, and FIG. 4B illustrates an example of a logic structure of the event processing data 2700.

As illustrated in FIG. 4A, the variable data 2600 is comprised of a title 2610 of a variable, an initial value 2620 of a variable, and a variable 2630 after varied.

The variable 2630 is initialized into the initial value 2620 before a schedule is carried out, and thereafter, updated.

As illustrated in FIG. 4B, the event-processing data 2700 is comprised of an identifier 2710 of a corresponding event, and an equation 2720 for calculating a variable.

The identifier 2710 is used for identifying an event, and the equation 2720 is carried out only when an event having an identifier identical with the identifier 2710 is transmitted from the first or second event-generating apparatus 1101 or 1102. A variable to be calculated is indicated in the equation 2720. For instance, the equation 2720 carries out the following operation to a variable X $$X=X+1$$

Each of the schedule data 2100 included in the schedule holder 2000 is comprised of a timing list 2200, a command list 2400, and a schedule identifier 2101 used for identifying the schedule data 2100, as illustrated in FIG. 3.

The timing list 2200 is a list indicating a timing at which a schedule is to be carried out, and the command list 2400 is a list indicating what control is to be carried out and how the control is to be carried out.

Figure 5A:
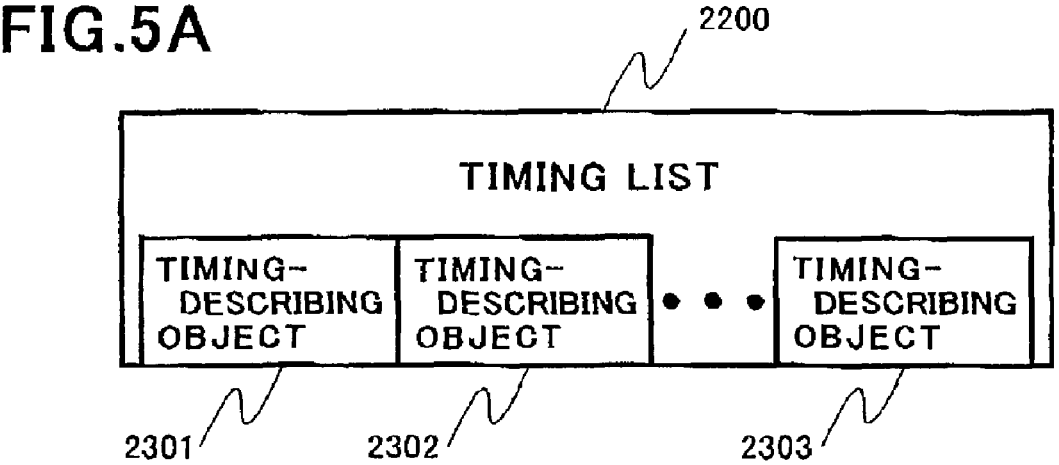
FIG. 5A illustrates an example of a structure of a timing list in the first embodiment.

The timing list 2200 may be designed to include a plurality of timing-describing objects 2301 to 2303 to make it possible to describe a plurality of timings at which a schedule is to be carried out, as illustrated in FIG. 5A. Accordingly, for instance, both of a timing at which distribution of a certain content starts and a timing at which the distribution ends can be described in a single timing list 2200. A timing at which an action having no timings at which it starts and ends, such as transmission of an e-mail, is to be carried out may be described in a timing list 2200.

Figure 5B:
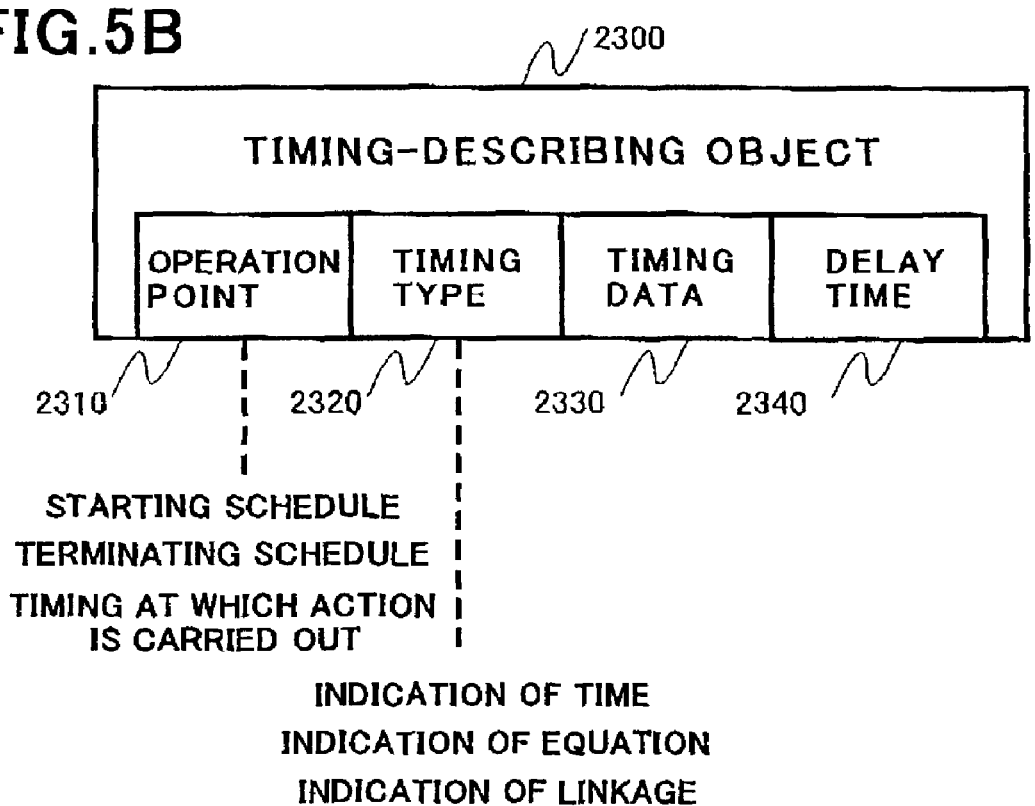
FIG. 5B illustrates an example of a structure of a timing-describing object in the first embodiment.

FIG. 5B illustrates a structure of each of the timing-describing objects 2300 included in the timing list 2200.

As illustrated in FIG. 5B, the timing-describing object 2300 includes sections of an operation point 2310, a timing type 2320, timing data 2330, and a delay time 2340.

In the operation point 2310, one of "starting a schedule", "terminating a schedule" and "a timing at which an action is to be carried out" is described.

The timing type 2320 indicates what a timing is defined with. Specifically, in the timing type 2320, one of "indicating of a time", "indication of an equation used for evaluating a variable" and "indication of linkage with other schedules" is described.

Figure 5C:
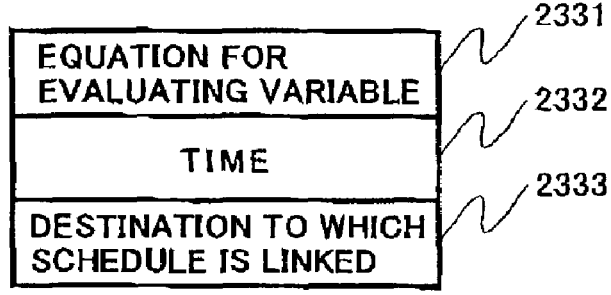
FIG. 5C illustrates an example of a structure of timing data in the first embodiment.

The timing data 2330 includes such a content as illustrated in FIG. 5C in accordance with the timing type 2320. Specifically, if the timing type 2320 includes "indication of an equation used for evaluating a variable", "an equation used for evaluating a variable" 2331 is described, if the timing type 2320 includes "indication of a time", "a time" 2332 is described, and if the timing type 2320 includes "indication of linkage with other schedules", "destination to which a schedule is to be linked" 2333 is described.

The equation 2331 is used for determining whether a timing is established. For instance, the equation 2331 is defined as X>0 to a variable X. If an answer calculated through the equation 2331 is true, a timing is established, but if an answer calculated through the equation 2331 is not true, a timing is not established.

The time 2332 indicates a time at which a timing is established. The time 2332 may be defined with an absolute time or a relative time. In an absolute time, a year, a month, a day, an hour, a minute and a second are indicated. In a relative time, how long time goes by from a reference time predetermined in the schedule holder 2000, for instance, is indicated.

When a schedule is carried out in linkage with other schedules, the other schedules are indicated in "destination to which a schedule is to be linked" 2333. Specifically, a schedule identifier 2101 and the operation point 2310 are determined in "destination to which a schedule is to be linked" 2333.

For instance, when a certain schedule is linked with establishment of a timing at which another schedule having a schedule identifier ABC is made start, "a schedule identifier=ABC" and "starting a schedule" are described in the destination 2333 of the certain schedule.

The delay time 2340 is used for adjusting a time at which a timing is established.

If the delay time 2340 is equal to zero (0), a timing is established when a time at which a later mentioned signal is to be transmitted reaches a time indicated in the time 2332 in a schedule where a time is indicated, when the equation 2331 becomes true in a schedule where an equation for evaluating a variable is indicated, or when another schedule indicated in the destination 2333 is established in a schedule where linkage with other schedules is indicated.

On the other hand, if the delay time 2340 is set equal to a certain time R, a timing is established when the time R has passed. For instance, the delay time 2340 is set equal to five minutes in a schedule where an equation for evaluating a variable is indicated, a timing is established in five minutes after the equation became true.

Figure 6A:
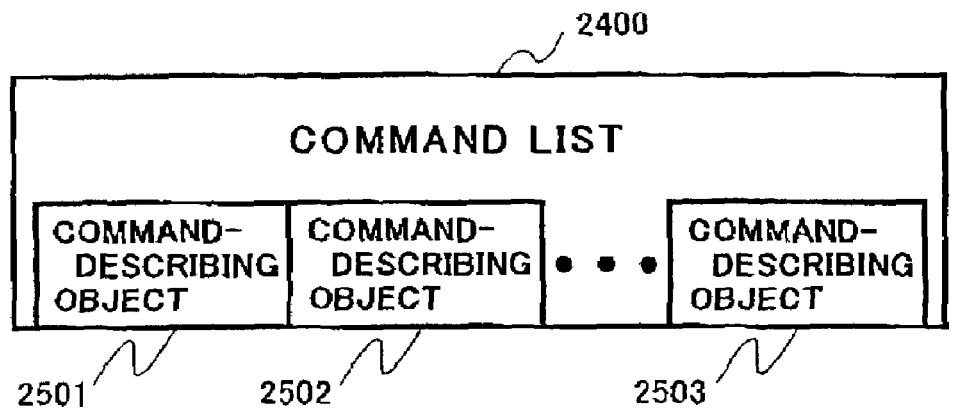
FIG. 6A illustrates an example of a structure of a command list in the first embodiment.

The command list 2400 may be designed to include a plurality of command-describing objects 2501 to 2503 in order to make it possible to describe a plurality of contents of controls to be carried out, as illustrated in FIG. 6A. This is because it is necessary for the command list 2400 to be able to carry out commands at separate timings, since the timing list 2200 can include a plurality of operation timings, and further because it is necessary to carry out a plurality of commands at a timing to thereby, for instance, simultaneously control a plurality of channel drivers.

Figure 6B:
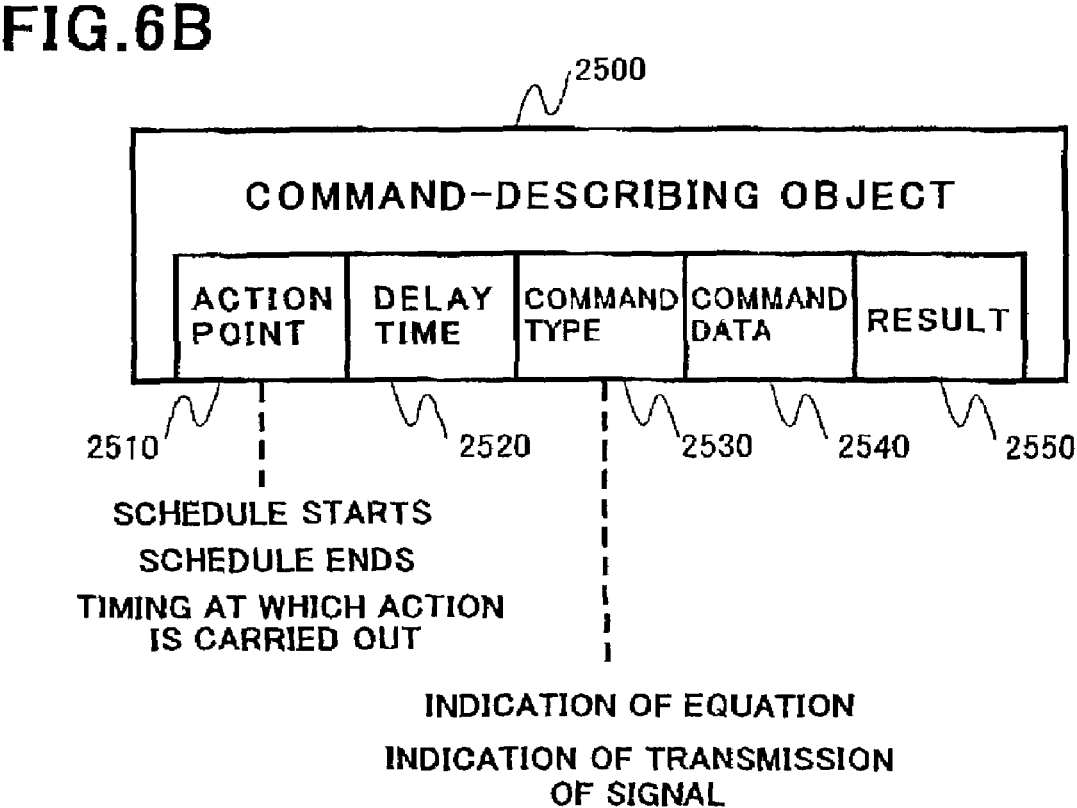
FIG. 6B illustrates an example of a structure of a command-describing object in the first embodiment.

As illustrated in FIG. 6B as a command-describing object 2500, each of the command-describing objects 2501 to 2503 included in the command list 2400 is comprised of an action point 2510, a delay time 2520, a command type 2530, command data 2540 and a result 2550.

The action point 2510 includes items "a schedule starts", "a schedule ends" and "a timing at which an action is to be carried out", and indicates which command is to be carried out when each of timings defined as "a schedule starts", "a schedule ends" and "a timing at which an action is to be carried out" is established.

If "a schedule starts" is defined in the action point 2510 in command-describing objects among the command-describing objects 2501 to 2503 included in the command list 2400, those command-describing objects are all carried out when a timing defined as "a schedule starts" is established in the associated timing list 2200. Similarly, if "a schedule ends" or "a timing at which an action is to be carried out" is defined in the action point 2510 in command-describing objects among the command-describing objects 2501 to 2503 included in the command list 2400, those command-describing objects are all carried out when a timing defined as "a schedule ends" or "a timing at which an action is to be carried out" is established in the associated timing list 2200.

The delay time 2520 is used for adjusting a time at which a signal is to be carried out. Whereas the delay time 2340 in the timing describing object 2300 is used for adjusting a time at which a timing is established for each of "a schedule starts", "a schedule ends" and "a timing at which an action is to be carried out", the delay time 2520 is used for adjusting a timing for each of commands.

For instance, if a timing is established in the timing-describing object 2300 where the operation point 2310 indicates "a schedule starts", the timing type 2320 indicates "a time", the timing data 2330 indicates a time T, and the delay time 2340 indicates a delay time R, all of the command-describing objects 2500 including the action point 2510 indicating "a schedule starts" are carried out. Herein, it is assumed that there are two such command-describing objects 2500 as mentioned above. If one of the command-describing objects 2501 includes the delay time 2520 equal to zero, and the other command-describing object 2502 includes the delay time 2520 equal to one minute, a signal associated with the command-describing object 2501 is carried out immediately when a timing is established, that is, at a time defined as "T+R", but a signal associated with the command-describing object 2501 is carried out one minute later, that is, at a time defined as "T+R+1 minute".

In the command type 2530, one of commands "indication of an equation used for calculating a variable" and "indication of transmission of a signal" is indicated.

The command "indication of transmission of a signal" is a command directed to the command-describing object 2500 to transmit a signal to the first to N-th channel drivers 1201 to 1203.

The command "indication of an equation used for calculating a variable" is a command directed to the command-describing object 2500 to update the variable data 2600.

As mentioned earlier, the variable data 2600 is updated by the equation 2720 included in the event-processing data 2700 in accordance with events generated in the first and second event-generating apparatuses 1101 and 1102. The command-describing object 2500 including the command type 2530 having indication of an equation used for calculating a variable could drive an event by means only of a feedback system included in the synchronization control server 1000 independently of occurrence of an event.

For instance, even if an event ABC does not occur for some reasons though the event ABC was expected to occur not later than a time T, and hence, a schedule defined with event linkage is not established, it would be possible to establish a schedule linking to the event ABC, as an exception, by means of an equation used for calculating a variable, included in the command-describing object 2500 in which a schedule is established at the time T.

Figure 6C:
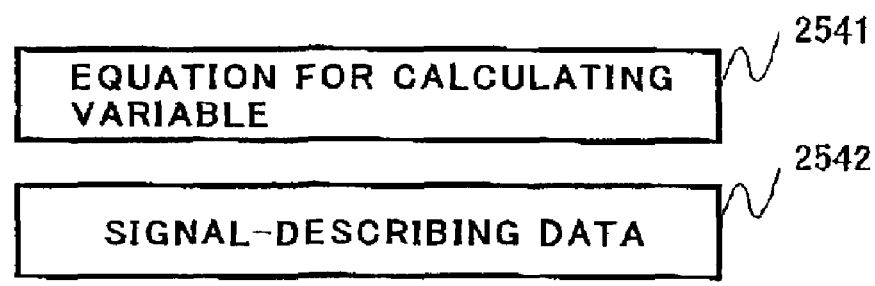
FIG. 6C illustrates an example of a structure of command data in the first embodiment.

As illustrated in FIG. 6C, the command data 2540 includes an equation 2541 used for calculating a variable, when the command data 2540 indicates the command "indication of an equation used for calculating a variable", and includes signal-describing data 2542 when the command data 2540 indicates the command "indication of transmission of a signal".

The equation 2541 used for calculating a variable is used for updating the variable data 2600. For instance, the equation 2541 is defined as X=X+1 to a variable X.

The signal-describing data 2542 is data in which a control to the first to N-th channel drivers 1201 to 1203 is described.

Figure 6D:
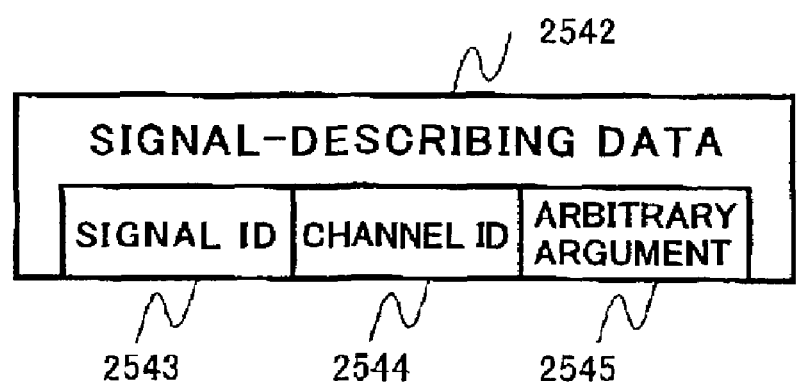
FIG. 6D illustrates an example of a structure of signal-describing data in the first embodiment.

FIG. 6D illustrates a logic structure of the signal-describing data 2542. The signal-describing data 2542 is comprised of a signal identifier 2543, a channel identifier 2544 and an arbitrary argument 2545.

The channel identifier 2544 is in advance provided to the first to N-th channel drivers 1201 to 1203. The channel identifier 2544 indicates which channel driver a signal is to be transmitted.

The signal identifier 2543 is in advance provided to the first to N-th channel drivers 1201 to 1203 for processing a signal. The signal identifier 2543 indicates which signal is to be processed.

The arbitrary argument 2545 defines an argument provided to the first to N-th channel drivers 1201 to 1203 to process a signal, from the synchronization control server 1000.

An application to be carried out in the first to N-th channel drivers 1201 to 1203 is identified by both an argument indicated in the arbitrary argument 2545 and the signal identifier 2543. Specifically, when each of the first to N-th channel drivers 1201 to 1203 includes a method for processing a signal, the signal identifier 2543 indicates an identifier of a method to be used, and the arbitrary argument 2545 indicates an argument to be provided to the method.

The result 2550 in the command-describing object 2500 is a log region in which a result obtained by carrying out the command-describing object 2500 is stored. If the command type 2530 in the command-describing object 2500 indicates the command "indication of transmission of a signal", one or more results transmitted from the first to N-th channel drivers 1201 to 1203 to which a signal is transmitted are stored.

The distribution schedule information edited in the schedule editor 1401 was explained above. The schedule editor 1401 editing the distribution schedule information is comprised, for instance, of a data processing device having a function of editing data, such as personal computer.

The distribution schedule information is described in a language such as XML (eXtensible Markup Language).

The distribution schedule information having been edited in the schedule editor 1401 is stored in a memory of the synchronization control server 1000, and used for carrying out a control. The schedule editor 1401 also changes the distribution schedule information stored in the synchronization control server 1000, to alter a schedule.

Hereinbelow is explained a signal transmitted to the first to N-th channel drivers 1201 to 1203 from the synchronization control server 1000.

Figure 7A:
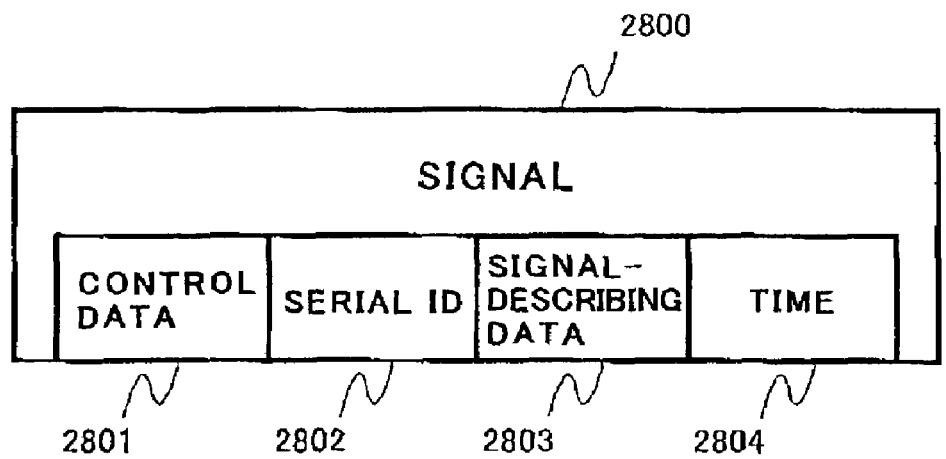
FIG. 7A illustrates an example of a structure of a signal in the first embodiment.

FIG. 7A illustrates a logic structure of a signal 2800 transmitted to the first to N-th channel drivers 1201 to 1203 from the synchronization control server 1000.

The signal 2800 is comprised of control data 2801, a serial identifier 2802, signal-describing data 2803 and a time 2804 at which a signal is to be carried out.

The control data 2801 includes an identifier which indicates that the signal 2800 is transmitted to the first to N-th channel drivers 1201 to 1203 before the first to N-th channel drivers 1201 to 1203 carry out the signal 2800.

The serial identifier 2802 is an identifier provided by the synchronization control server 1000 in order to identify the signal 2800. The serial identifier 2802 is used, after the signal 2800 has been transmitted to the first to N-th channel drivers 1201 to 1203 before the first to N-th channel drivers 1201 to 1203 carry out the signal 2800, for remote-controlling the signal 2800 in the first to N-th channel drivers 1201 to 1203, from the synchronization control server 1000.

The signal-describing data 2803 is identical with the signal-describing data 2542 illustrated in FIG. 6D. That is, the signal-describing data 2803 is comprised of a signal identifier 2543, a channel identifier 2544, and an arbitrary argument 2545.

The time 2804 indicates a time at which the first to N-th channel drivers 1201 to 1203 actually carry out the signal 2800.

The signal 2800 is once stored in a memory in the first to N-th channel drivers 1201 to 1203, and then, is carried out when a present time reaches the time 2804. The time 2804 is equal to a sum of a time at which a timing is established, and the delay time 2520.

The synchronization control server 1000 transmits not only the above-mentioned signal 2800, but also a signal indicative of a command to immediately carry out the signal, to the first to N-th channel drivers 1201 to 1203.

The signal indicative of a command to immediately carry out the signal has a logic structure almost the same as that of the signal 2800 illustrated in FIG. 7A except that the control data 2801 includes an identifier indicative of a command to immediately carry out the signal. In the signal indicative of a command to immediately carry out the signal, the time 2804 is preferably omitted. Even if the signal includes the time 2804, the first to N-th channel drivers 1201 to 1203 ignore the time 2804.

Signals including commands to terminate, interrupt or restart a transmitted signal are also transmitted to the first to N-th channel drivers 1201 to 1203 from the synchronization control server 1000.

A termination command to terminate a signal is used for disallowing to carry out a signal having a designated serial identifier.

A interruption command to interrupt a signal is used for temporarily stop carrying out a signal having a designated serial identifier.

A restart command to restart a signal is used for restart carrying out a signal having been temporarily stopped being carried out by the interruption command.

Figure 7B:
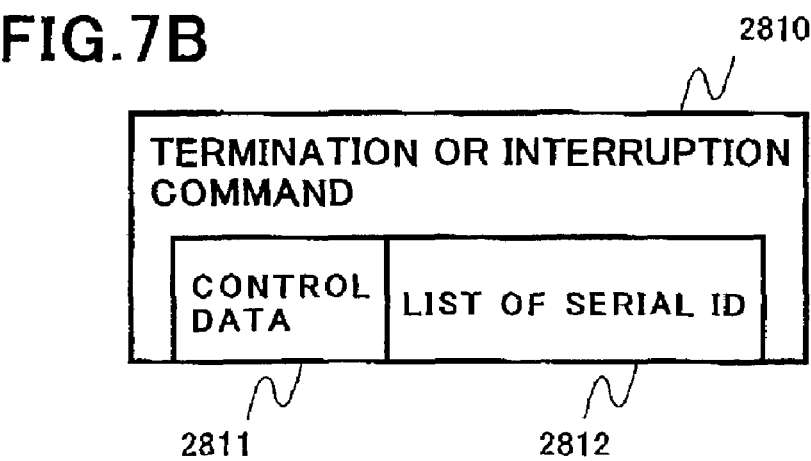
FIG. 7B illustrates an example of a structure of a termination or interruption command in the first embodiment.

As illustrated in FIG. 7B, each of the termination command 2810 and the interruption command 2810 has a logic structure comprised of control data 2811 and a list 2812 of a serial identifier.

The control data 2811 includes an identifier indicative of termination for the termination command, or an identifier indicative of interruption for the interruption command.

The list 2812 of a serial identifier identifies serial identifiers of a signal or signals which is(are) to be terminated or interrupted.

Figure 7C:
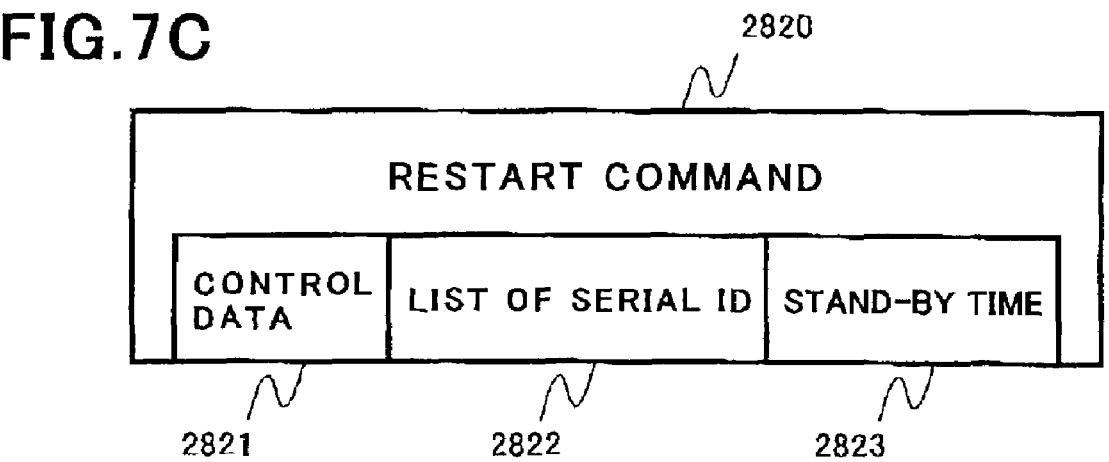
FIG. 7C illustrates an example of a structure of a restart command in the first embodiment.

FIG. 7C illustrates a logic structure of the restart command 2820. The restart command 2820 is comprised of control data 2821, a list 2822 of a serial identifier, and a stand-by time 2823.

The control data 2821 includes an identifier indicative of "restart". The list 2822 identifies of serial identifiers of signals to be restarted. The stand-by time 2823 indicates a period of time after interruption until restart.

Hereinbelow is explained a structure of the synchronization control server 1000.

Figure 8:
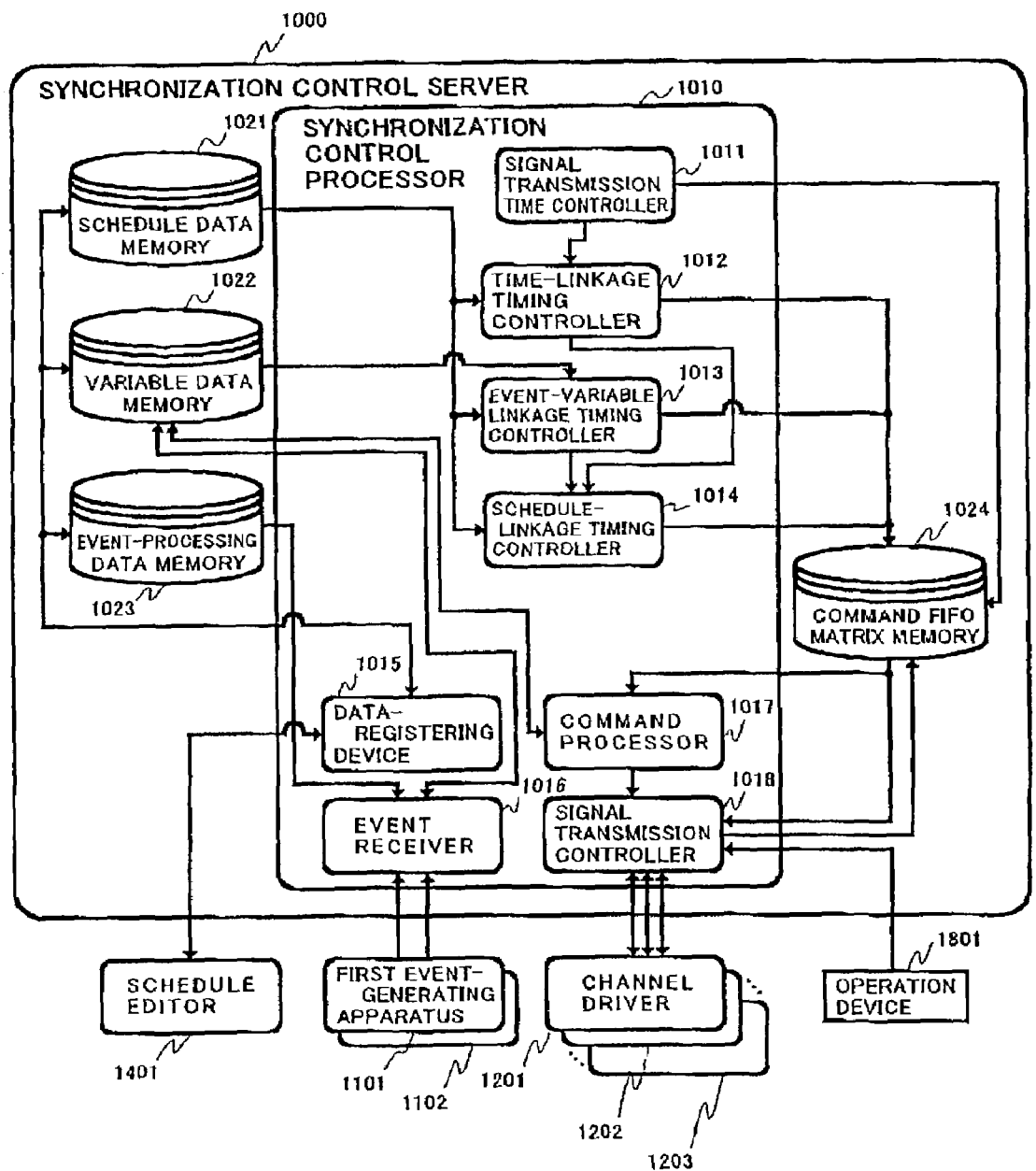
FIG. 8 is a block diagram of a synchronization control server in the first embodiment.

FIG. 8 is a block diagram of the synchronization control server 1000.

The synchronization control server 1000 is comprised of a synchronization control processor 1010, a schedule data memory 1021, a variable data memory 1022, an event-processing data memory 1023, and a command FIFO matrix memory 1024.

The synchronization control processor 1010 is comprised of a signal transmission time controller 1011, a time-linkage timing controller 1012, an event-variable linkage timing controller 1013, a schedule-linkage timing controller 1014, a data-registering device 1015, an event receiver 1016, a command processor 1017, and a signal transmission controller 1018.

The data-registering device 1015 is connected to the schedule editor 1401. On receipt of the schedule holder 2000 (see FIG. 3) from the schedule editor 1401, the data-registering device 1015 stores the schedule data 2100 into the schedule data memory 1021, the variable data 2600 into the variable data memory 1022, and the event-processing data 2700 into the event-processing data memory 1023, respectively.

In addition, the data-registering device 1015 reads data out of the memories 1021, 1022 and 1023, and outputs the thus read-out data to the schedule editor 1401, and updates data stored in the memories 1021, 1022 and 1023, based on data revised by a system administrator through the schedule editor 1401.

The event receiver 1016 receives an event identifier transmitted from the first and second event-generating apparatuses 1101 and 1102. On receipt of an event identifier, the event receiver 1016 retrieves the event-processing data memory 1023 to find the event-processing data 2700 having the event identifier 2710 identical with the event identifier received from the first and second event-generating apparatuses 1101 and 1102. Then, the event receiver 1016 carries out the equation 2720 included in the event processing data 2700, to thereby update the variable 2630 of the associated variable data 2600 stored in the variable data memory 1022.

For instance, if the equation 2720 is comprised of $X=X+1$, the event receiver 1016 retrieves the variable data memory 1022 to find the variable data 2600 having the variable title 2610 of X, and then, update the current variable 2630 into "+1". The variable 2630 included in the variable data 2600 is updated also when the command-describing object 2500 including "indication of an equation used for calculating a variable" in the command type 2530 is carried out in the command processor 1017. In either case, when the variable 2630 included in the variable data 2600 is updated, a notification indicating so is transmitted to the event-variable linkage timing controller 1013.

The signal transmission time controller 1011 transmits a time advancing by a period of time T from a present time to the time-linkage timing controller 1012 and the command FIFO matrix memory 1024, as a time at which a signal is to be transmitted. If the period of time T is too short, it would not be possible to absorb a network delay time which occurs when the synchronization control server 1000 makes communication with the first to N-th channel drivers 1201 to 1203. On the other hand, if the period of time T is too long, the first to N-th channel drivers 1201 to 1203 have to a large capacity to store the signals 2800 therein. Hence, the period of time T is determined so as to avoid the above-mentioned problems. For instance, the period of time T is determined to be about one minute.

The time-linkage timing controller 1012 detects whether a timing of a schedule defined with a time is established. The time-linkage timing controller 1012 detects the time 2332 described in the timing-describing object 2300 (except the timing-describing objects 2300 in which establishment of a timing has been already detected) where the timing type 2320 indicates a time among the schedule data 2100 stored in the schedule data memory 1021, and checks whether a sum of the time and the delay time 2340 expressed in an absolute time is identical with a time at which a signal is to be transmitted, provided from the signal transmission time controller 1011. Thus, the time-linkage timing controller 1012 detects the timing-describing object 2300 in which a timing of a schedule is established.

Detecting the timing-describing object 2300 in which a timing of a schedule is established, the time-linkage timing controller 1012 stores all of the command-describing objects 2500 including the action point 2510 identical with the operation point 2310 in the timing-describing object 2300 in which a timing has been established, among the command-describing objects 2500 included in the command list 2400 associated with the timing list 2200 including the detected timing-describing object 2300, to the command FIFO matrix memory 1024.

In addition, the time-linkage timing controller 1012 notifies the schedule-linkage timing controller 1014 of the operation point 2310 of the timing-describing object 2300 in which a timing has been established, and the schedule identifier 2101 identifying the schedule data 2100 having the timing list 2200 including the timing-describing object 2300. Then, the time-linkage timing controller 1012 marks the timing-describing object 2300 having been processed as mentioned above, and administrates the timing-describing object 2300 as a processed one.

Figure 9:
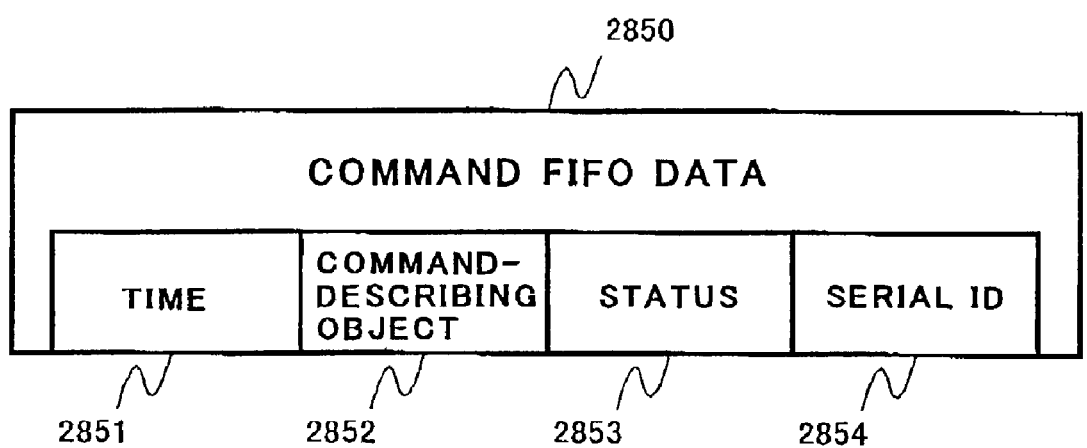
FIG. 9 illustrates an example of a structure of command FIFO data in the first embodiment.

FIG. 9 illustrates a logic structure of command FIFO data which is one of data stored in the command FIFO matrix memory 1024.

The command FIFO data 2850 is comprised of a time 2851 at which a command is to be carried out, a command-describing object 2852, status 2853 about transmission of a signal, and a serial identifier 2854.

The time-linkage timing controller 1012 copies each of the command-describing objects 2500 stored in the command FIFO matrix memory 1024, into the command-describing object 2852 by means of the single command FIFO data 2850.

The time-linkage timing controller 1012 determines a sum a time at which a timing is established (which is equal to a sum of the time 2332 and the delay time 2340 and is expressed in an absolute time) and the delay time 2520 of the command-describing object 2500, as the time 2851. In addition, the time-linkage timing controller 1012 sets the status 2853 as "not transmitted", and determines a unique serial identifier as the serial identifier 2854.

The event-variable linkage timing controller 1013 detects whether a timing in a schedule defined with an event is established. When informed that the variable 2630 of the variable data 2600 in the variable data memory 1022 is varied, the event-variable linkage timing controller 1013 detects the equation 2331 described in the timing-describing object 2300 (except the timing-describing objects 2300 in which establishment of a timing has been already detected) where the timing type 2320 indicates "an equation used for evaluating a variable" among the schedule data 2100 stored in the schedule data memory 1021, and checks whether the equation 2331 is true or not.

It is now assumed that the event-variable linkage timing controller 1013 judges at a time tc that the equation 2331 is true in a certain timing-describing object 2300. Then, the event-variable linkage timing controller 1013 detects a timing-describing object 2300 in which a timing of a schedule is established, under the assumption that a timing is established when the delay time 2340 of the timing-describing object 2300 has passed after the time tc.

Detecting the timing-describing object 2300 in which a timing of a schedule is established, the event-variable linkage timing controller 1013 stores all of the command-describing objects 2500 including the action point 2510 identical with the operation point 2310 in the timing-describing object 2300 in which a timing has been established, among the command-describing objects 2500 included in the command list 2400 associated with the timing list 2200 including the detected timing-describing object 2300, into the command FIFO matrix memory 1024.

The storage of the command-describing objects 2500 into the command FIFO matrix memory 1024 is carried out in the same way as that of the time-linkage timing controller 1012. Then, the time 2851 at which a command is to be carried out, the command-describing object 2852, the status 2853 about transmission of a signal, and the serial identifier 2854 are determined in the command FIFO data 2850 illustrated in FIG. 9.

In addition, the event-variable linkage timing controller 1013 notifies the schedule-linkage timing controller 1014 of the operation point 2310 of the timing-describing object 2300 in which a timing has been established, and the schedule identifier 2101 identifying the schedule data 2100 having the timing list 2200 including the timing-describing object 2300. Then, the time-linkage timing controller 1012 marks the timing-describing object 2300 having been processed as mentioned above, and administrates the timing-describing object 2300 as a processed one.

The schedule-linkage timing controller 1014 detects whether a schedule linking to other schedules is established. When informed of the schedule identifier 2101 and the operation point 2310 from the time-linkage timing controller 1012 and the event-variable linkage timing controller 1013, the schedule-linkage timing controller 1014 detects a schedule identifier and an operation point indicated by the destination 2333 described in the timing-describing object 2300 (except the timing-describing objects 2300 in which establishment of a timing has been already detected) where the timing type 2320 indicates "linkage with other schedules" among the schedule data 2100 stored in the schedule data memory 1021, and checks whether the thus detected schedule identifier and operation point are identical with the informed schedule identifier 2101 and operation point 2310.

It is now assumed that the schedule-linkage timing controller 1014 judges at a time tc that the thus detected schedule identifier and operation point are identical with the informed schedule identifier 2101 and operation point 2310 in a certain timing-describing object 2300. Then, the schedule-linkage timing controller 1014 detects a timing-describing object 2300 in which a timing of a schedule is established, under the assumption that a timing is established when the delay time 2340 of the timing-describing object 2300 has passed after the time tc.

Detecting the timing-describing object 2300 in which a timing of a schedule is established, the schedule-linkage timing controller 1014 stores all of the command-describing objects 2500 including the action point 2510 identical with the operation point 2310 in the timing-describing object 2300 in which a timing has been established, among the command-describing objects 2500 included in the command list 2400 associated with the timing list 2200 including the detected timing-describing object 2300, into the command FIFO matrix memory 1024.

The storage of the command-describing objects 2500 into the command FIFO matrix memory 1024 is carried out in the same way as that of the time-linkage timing controller 1012. Then, the time 2851 at which a command is to be carried out, the command-describing object 2852, the status 2853 about transmission of a signal, and the serial identifier 2854 are determined in the command FIFO data 2850 illustrated in FIG. 9.

Then, the schedule-linkage timing controller 1014 marks the timing-describing object 2300 having been processed as mentioned above, and administrates the timing-describing object 2300 as a processed one.

In addition, the schedule-linkage timing controller 1014 judges whether a timing of a schedule linking with a schedule which further links with another schedule is established, based on both the operation point 2310 of the timing-describing object 2300 in which the schedule-linkage timing controller 1014 judges that a timing is established, and the schedule identifier 2101 of the schedule data 2100 including the timing list 2200 having the timing-describing object 2300, in the same way as the above-mentioned case in which the schedule-linkage timing controller 1014 does the same when informed of the schedule identifier 2101 and the operation point 2310 from the time-linkage timing controller 1012 and the event-variable linkage timing controller 1013.

The command FIFO matrix memory 1024 stores a plurality of such command FIFO data 2850 as illustrated in FIG. 9. The command FIFO matrix memory 1024 distributes the command-describing objects 2852 in each of the command FIFO data 2850, to the command processor 1017 or the signal transmission controller 1018, based on the time at which a signal is to be transmitted and the present time both provided from the signal transmission time controller 1011.

Specifically, the command FIFO matrix memory 1024 compares the time 2851 to a time at which a signal is to be transmitted, with respect to the command FIFO data 2850 in which the status 2853 indicates "not transmitted", and the command type 2530 in the command-describing object 2852 indicates "transmission of a signal". Then, the command FIFO matrix memory 1024 transmits the time 2851 which is judged identical with a time at which a signal is to be transmitted, the command-describing object 2852 and the serial identifier 2854 to the signal transmission controller 1018. The command FIFO matrix memory 1024 instructs the signal transmission controller 1018 to transmit a signal in advance of carrying out a schedule, and then, the status 2853 in the command FIFO data 2850 having been just processed is changed into "transmitted".

Among the command FIFO data 2850 stored in the command FIFO matrix memory 1024 from the controllers 1012 to 1014, most of the command FIFO data 2850 having the command type 2530 indicating "transmission of a signal" is transmitted in advance of carrying out a schedule.

However, among the command FIFO data 2850 stored in the command FIFO matrix memory 1024 from the event-variable linkage timing controller 1013 and the schedule-linkage timing controller 1014, some command FIFO data 2850 cannot be transmitted in advance of carrying out a schedule, because the delay time 2520 is too short (for instance, the delay time 2520 is equal to zero). In addition, it is necessary to deal with the command FIFO data 2850 including the command type 2530 indicating an equation used for calculating a variable, not with a time at which a signal is to be transmitted, but with a present time.

Hence, the command FIFO matrix memory 1024 compares the time 2851 to a present time with respect to the command FIFO data 2850 having the status 2853 indicating "not transmitted", and transmits the command-describing object 2852 and the serial identifier 2854 in the command FIFO data 2850 to the command processor 1017, if the time 2851 is coincident with a present time.

The status 2853 in the command FIFO data 2850 transmitted to the command processor 1017 is also changed into "transmitted".

On receipt of the command-describing object 2852 and the serial identifier 2854 from the command FIFO matrix memory 1024, the command processor 1017 carries out different steps from each other in accordance with whether the command type 2530 in the command-describing object 2852 indicates "an equation used for calculating a variable" or "transmission of a signal".

If the command type 2530 in the command-describing object 2852 indicates "an equation used for calculating a variable", the command processor 1017 carries out the equation 2541 described in the command data 2540 included in the command-describing object 2852, to thereby change the variable 2630 included in the variable data 2600. Specifically, the command processor 1017 retrieves the present variable 2630 included in the variable data 2600 having a variable found in the equation 2541, as the title 2610, in the variable data memory 1022, and then, calculates a new variable 2630 in accordance with the equation through the use of the retrieved variable 2630. Then, the command processor 1017 replaces the original variable with the new variable 2630.

If the command type 2530 in the command-describing object 2852 indicates "transmission of a signal", the command processor 1017 transmits the command-describing object 2852 and the serial identifier 2854, both received from the command FIFO matrix memory 1024, to the signal transmission controller 1018, and instructs the signal transmission controller 1018 to distribute the command-describing object 2852 and the serial identifier 2854 to the first to N-th channel drivers 1201 to 1203.

On receipt of the time 2851, the command-describing object 2852 and the serial identifier 2854 from the command FIFO matrix memory 1024, the signal transmission controller 1018 transmits a signal which will be carried out later. On receipt of the command-describing object 2852 and the serial identifier 2854 from the command FIFO matrix memory 1024, the signal transmission controller 1018 transmits a signal which is to be carried out immediately.

When a signal will be carried out later, the signal transmission controller 1018 produces the signal 2800 illustrated in FIG. 7A, based on the time 2851, the command-describing object 2852 and the serial identifier 2854 received from the command FIFO matrix memory 1024, and transmits the signal 2800 to the associated channel driver 1201 to 1203 through a network. The control data 2801 in the signal 2800 includes an identifier indicative of transmission of a signal which will be carried out later, the serial identifier 2802 includes the received serial identifier 2854, the signal-describing data 2803 includes the signal-describing data 2542 described in the command data 2540 included in the received command-describing object 2852, and the time 2804 indicates the received time 2851.

The signal 2800 is transmitted to a channel driver identified with a channel identifier included in the signal-describing data 2542.

When a signal is to be carried out immediately, the signal transmission controller 1018 produces the signal 2800 illustrated in FIG. 7A, based on the command-describing object 2852 and the serial identifier 2854 received from the command processor 1017, and transmits the signal 2800 to the associated channel driver 1201 to 1203 through a network. The control data 2801 in the signal 2800 includes an identifier indicating that the signal has to be carried out immediately, the serial identifier 2802 includes the received serial identifier 2854, the signal-describing data 2803 includes the signal-describing data 2542 described in the command data 2540 included in the received command-describing object 2852, and the time 2804 is omitted.

The signal 2800 is transmitted to a channel driver identified with a channel identifier included in the signal-describing data 2542.

The signal transmission controller 1018 produces commands to terminate, interrupt or restart the signal 2800 transmitted to the first to N-th channel drivers 1201 to 1203, in accordance with an instruction input thereinto from a system administrator through the operation device 1801, and transmits the thus produced commands to the first to N-th channel drivers 1201 to 1203.

Hereinbelow is explained a function of signal transmission controller 1018 to produce commands to terminate, interrupt or restart the signal 2800.

If a system administrator provides an instruction to interrupt a schedule to the synchronization control server 1000 through the operation device 1801, the synchronization control processor 1010 interrupts transmission of a time at which a signal will be carried out later and carrying out a schedule. As a result, it is interrupted to carry out a schedule in the schedule holder 2000.

In addition, the signal transmission controller 1018 carries out the following steps.

The signal transmission controller 1018 retrieves the command FIFO matrix memory 1024 to find the command FIFO data 2850 including the status 2853 indicating "already transmitted", and then change the status 2853 into "interrupted". Then, the signal transmission controller 1018 makes a list of the serial identifiers 2854 for each of the channel identifiers 2544 included in the signal-describing data 2542 included in the command-describing object 2852, based on the retrieved command FIFO data 2850. Then, the signal transmission controller 1018 puts an identifier indicative of "interruption" in the control data 2811 illustrated in FIG. 7B for each of the channel identifiers 2544, produces a command to interrupt a schedule, including a list of the serial identifiers 2854, in the list 2812 of serial identifiers, and then, transmits the command to the first to N-th channel drivers 1201 to 1203 identified with the channel identifier 2544.

When a system administrator instructs the synchronization control server 1000 to restart a schedule through the operation device 1801, the synchronization control processor 1010 operates as follows.

The signal transmission controller 1018 retrieves the command FIFO matrix memory 1024 to find all of the command FIFO data 2850 including the status 2853 indicating "interruption".

Then, the signal transmission controller 1018 makes a list of the serial identifiers 2854 for each of the channel identifiers 2544 included in the signal-describing data 2542 described in the command-describing object 2852 of the retrieved command FIFO data 2850.

Then, the signal transmission controller 1018 puts an identifier indicating "restart" in the control data 2821 (see FIG. 7C) in each of the channel identifiers 2544, arranges a list of the serial identifiers 2854 in the list 2822 of a serial identifier, produces a command to restart the signal which command is accompanied with a period of time from the interruption to the restart as the stand-by time 2823, and transmits the command to the first to N-th channel drivers 1201 to 1203 identified with the channel identifier 2544. The stand-by time 2823 is added to a stand-by time storage (not illustrated) arranged in the signal transmission controller 1018. The stand-by time storage has an initial value of zero.

Then, the synchronization control processor 1010 causes the signal transmission time controller 1011 to restart transmitting the signal and carrying out the signal. When the signal 2800 illustrated in FIG. 7A is produced, the signal transmission controller 1018 sets a sum of the time 2851 included in the command FIFO data 2850 and a period of time stored in the stand-by time storage, as the time 2804 to thereby slide a schedule.

When a system administrator instructs the synchronization control server 1000 to terminate a schedule through the operation device 1801, the synchronization control server 1000 causes the signal transmission time controller 1011 to stop transmitting the signal and carrying out the signal. As a result, a schedule in the schedule holder 2000 stops its progress.

The synchronization control server 1000 causes the signal transmission controller 1018 to carry out the following process.

First, the signal transmission controller 1018 retrieves the command FIFO matrix memory 1024 to find all of the command FIFO data 2850 regardless of whether the status 2853 indicates "transmission" or "interruption", and changes the status 2853 in each of the command FIFO data 2850 into "termination".

Then, the signal transmission controller 1018 makes a list of the serial identifiers 2854 for each of the channel identifiers 2544 included in the signal-describing data 2542 described in the command-describing object 2852 of the retrieved command FIFO data 2850.

Then, the signal transmission controller 1018 puts an identifier indicating "termination" in the control data 2821 (see FIG. 7C) in each of the channel identifiers, 2544, arranges a list of the serial identifiers 2854 in the list 2822 of a serial identifier, produces a command to terminate the signal which command is accompanied with the list of the serial identifiers 2854, and transmits the command to the first to N-th channel drivers 1201 to 1203 identified with the channel identifier 2544. The stand-by time 2823 is added to a stand-by time storage (not illustrated) arranged in the signal transmission controller 1018. The stand-by time storage has an initial value-of zero.

The synchronization control server 1000 has such a structure as mentioned above, and operates in such a manner as mentioned above.

The synchronization control server 1000 may be accomplished by a data processor such as a personal computer or a work station, and a program to carry out synchronization control. Such a program may be presented through a recording medium readable by a computer. The program is read out into a data processor when the data processor starts its operation. By controlling an operation of the data processor, the parts constituting the synchronization control processor 1010, such as the signal transmission time controller 1011, the time-linkage timing controller 1012, the event-variable linkage timing controller 1013, the schedule-linkage timing controller 1014, the data register device 1015, the event receiver 1016, the command processor 1017 and the signal transmission controller 1018, can be accomplished in the data processor. The memories 1021 to 1024 can be accomplished by a storage device of the data processor, such as a magnetic disc.

In the specification, the term "recording medium" means any medium which can record data therein.

The term "recording medium" includes, for instance, a disk-shaped recorder such as CD-ROM (Compact Disk-ROM) or PD, a magnetic tape, MO (Magneto Optical Disk), DVD-ROM (Digital Video Disk-Read Only Memory), DVD-RAM (Digital Video Disk-Random Access Memory), a floppy disk, a memory chip 404 such as RAM (Random Access Memory) or ROM (Read Only Memory), EPROM (Erasable Programmable Read Only Memory), EEPROM (Electrically Erasable Programmable Read Only Memory), smart media (Registered Trade Mark), a flush memory, a rewritable card-type ROM such as a compact flush card, a hard disk, and any other suitable means for storing a program therein.

A recording medium storing a program for accomplishing the synchronization control server 1000 may be accomplished by programming functions of the synchronization control server 1000 with a programming language readable by a computer, and recording the program in a recording medium such as mentioned above.

A hard disc equipped in a server may be employed as a recording medium. It is also possible to accomplish the recording medium in accordance with the present invention by storing the above-mentioned computer program in such a recording medium as mentioned above, and reading the computer program by other computers through a network.

As a computer, there may be used a personal computer, a desk-top type computer, a note-book type computer, a mobile computer, a lap-top type computer, a pocket computer, a server computer, a client computer, a workstation, a host computer, a commercially available computer, and electronic exchanger, for instance.

Hereinbelow is explained a structure of the first to N-th channel drivers 1201 to 1203. As a typical one, the first channel driver 1201 making communication with the second event-generating apparatus 1102 is explained hereinbelow.

Figure 10:
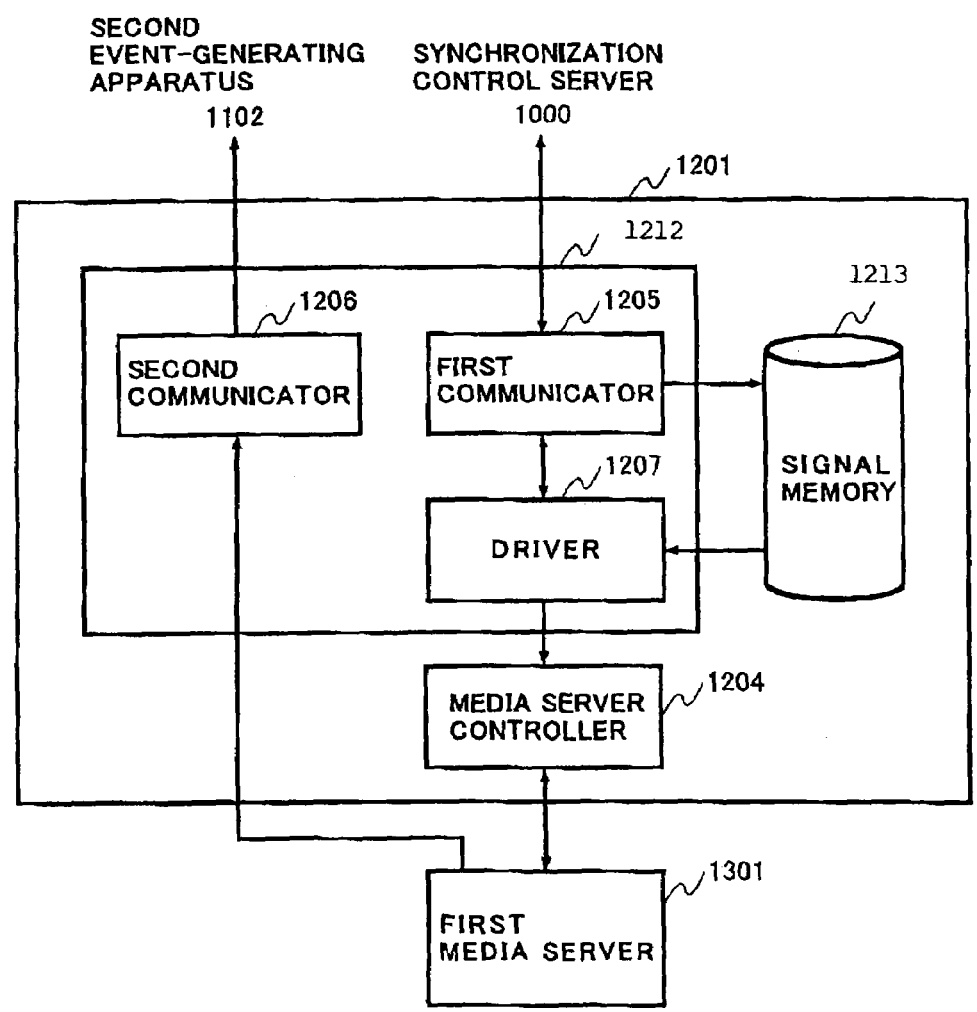
FIG. 10 is a block diagram of a channel driver in the first embodiment.

FIG. 10 is a block diagram of the first channel driver 1201.

The first channel driver 1201 is comprised of a processor 1212, a signal memory 1213, and a media server controller 1204. The processor 1212 is comprised of a first communicator 1205, a second communicator 1206, and a driver 1207. The second to N-th channel drivers 1202 to 1203 do not include the second communicator 1206, since they are not connected to the second event-generating apparatus 1102.

The first communicator 1205 makes communication with the synchronization control server 1000 through a network through a predetermined communication protocol. The second communicator 1206 makes communication with the second event-generating apparatus 1102 through a network through a predetermined communication protocol. In place of the first and second communicators 1205 and 1206, there may be used a single-communicator.

The signal memory 1213 stores the signals 2800 which will be carried out later. The signal memory 1213 is comprised of a magnetic disc, for instance.

The signal 2800 stored in the signal memory 1213 is comprised of the control data 2801, the serial identifier 2802, the signal-describing data 2803 and the time 2804, as illustrated in FIG. 7A. The signal-describing data 2803 is comprised of the signal identifier 2543, the channel identifier 2544 and the arbitrary argument 2545, as illustrated in FIG. 6D.

When the first communicator 1205 receives a signal directed to the first channel driver 1201, from the synchronization control server 1000, the first communicator 1205 stores the received signal in the signal memory 1213, if the received signal has an identifier indicating that the signal will be carried out later. On the other hand, if the received signal has an identifier indicating that the signal has to be carried out immediately, or if the received signal has a termination, interruption or restart command having an identifier indicating "termination", "interruption" or "restart", respectively, the first communicator 1205 transmits the received signal to the driver 1207.

A result of an operation carried out by the driver 1207 is transmitted to the synchronization control server 1000 through the first communicator 1205.

The driver 1207 compares the time 2804 stored in the signal memory 1213, to a present time to thereby detect a signal having a timing at which the signal has to be carried out now. Then, the driver 1207 informs the media server controller 1204 of the signal identifier 2543 and the arbitrary argument 2545 included in the signal-describing data 2803 of the detected signal.

On receipt of the signal having the control data 2801 including an identifier indicating that the signal has to be carried out immediately, from the first communicator 1205, the driver 1207 informs the media server controller 1204 of the signal identifier 2543 and the arbitrary argument 2545 included in the signal-describing data 2803 of the received signal.

The media server controller 1204 carries out an application identified by the signal identifier 2543 and the arbitrary argument 2545 both received from the driver 1207, to thereby control the first media server 1301.

On receipt of the termination, interruption or restart commands, the driver 1207 carries out a process in accordance with them. The termination or interruption command includes the control data 2811 and the list 2812 of a serial identifier, as illustrated in FIG. 7B, and the restart command includes the control data 2821, the list 2822 of a serial identifier, and the stand-by time 2823, as illustrated in FIG. 7C.

On receipt of the interruption command, the driver 1207 interrupts carrying out a signal having a serial identifier listed in the serial identifier list 2812 accompanied with the interruption command, among signals stored in the signal memory 1213.

On receipt of the restart command, the driver 1207 adds the stand-by time 2823 to the time 2804 of a signal having a serial identifier listed in the serial identifier list 2812 accompanied with the restart command, among signals stored in the signal memory 1213, to thereby stop interruption.

On receipt of the termination command, the driver 1207 deletes a signal having a serial identifier listed in the serial identifier list 2812 accompanied with the termination command, among signals stored in the signal memory 1213.

The driver 1207 transmits various notification to the signal transmission controller 1018 through the first communicator 1205 in order for the synchronization control server 1000 to grasp an operation of the first channel driver 1201.

For instance, when the signal starts being carried out and when the signal finishes being carried out, the driver 1207 transmits signals indicative of these facts, to the signal transmission controller 1018. The signal transmission controller 1018 stores the signals received from the driver 1207, in the result 2550 included in command-describing object 2852 of the associated command FIFO data 2850 in the command FIFO matrix memory 1024.

The first channel driver 1201 can determine whether it receives a notification from the driver 1207. Specifically, the first channel driver 1201 may receive a notification before a signal is carried out, and/or a notification after a signal has been carried out. As an alternative, the first channel driver 1201 may determined not to receive a notification from the driver 1207.

The driver 1207 further transmits a serial identification of a signal which is successfully terminated, interrupted or restarted, or a serial identification of a signal which could not be terminated, interrupted or restarted since the signal has been already carried out, to the signal transmission controller 1018. The signal transmission controller 1018 stores these serial identifications in the result 2550 included in command-describing object 2852 of the associated command FIFO data 2850 in the command FIFO matrix memory 1024.

The second communicator 1206 transmits an event received from the first media server 1301, to the second event-generating apparatus 1102 through a network. The second event-generating apparatus 1102 transmits an identifier of the received event to the synchronization control server 1000, if an identifier of an event corresponding to a type of the received event.

The second communicator 1206 may be designed to have the same function as a function of the second event-generating apparatus 1102 to thereby transmit an identifier of an event corresponding to a type of the event received from the first media server 1301, directly to the synchronization control server 1000 through a network.

As an alternative, the first media server 1301 may be designed to have the same function as a function of the second event-generating apparatus 1102 to thereby transmit an identifier of an event corresponding to a type of the event received from the first media server 1301, directly to the synchronization control server 1000 through a network.

The media server controller 1204 is unique to the first media server 1301 to be controlled. On the other hand, the processor 1212 and the signal memory 1213 may be used for any of the channel drivers.

The processor 1212 may be accomplished by a data processor such as a personal computer or a work station, and a control program. Such a control program may be presented through a recording medium readable by a computer. The control program is read out into a data processor when the data processor starts its operation. By controlling an operation of the data processor, the parts constituting the processor 1212, such as the first communicator 1205, the second communicator 1206 and the driver 1207, can be accomplished in the data processor. The signal memory 1213 can be accomplished by a storage device of the data processor, such as a magnetic disc.

Hereinbelow is explained an operation of the broadcasting system in accordance with the first embodiment.

Figure 11:
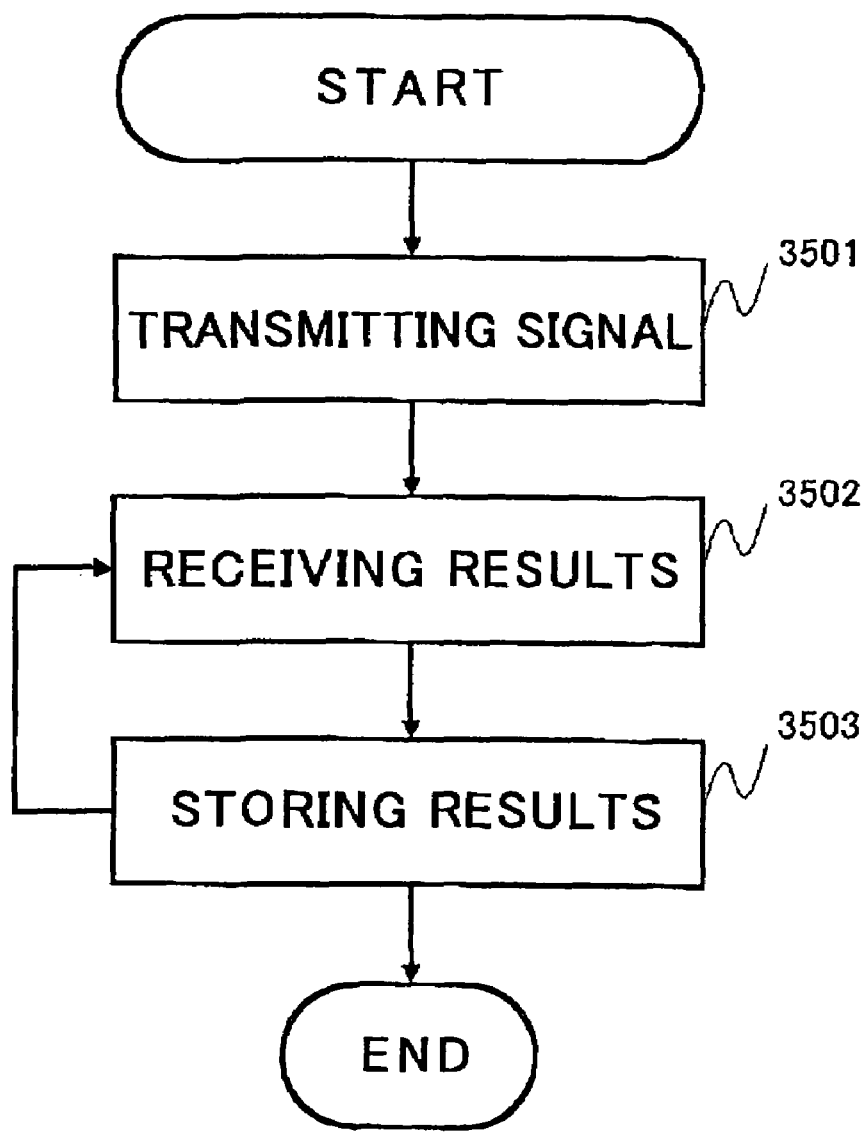
FIG. 11 is a flow chart showing a process of transmitting a signal in advance.

FIG. 11 is a flow chart of a process to transmit the signal 2800 which will be carried out later.

The signal 2800 which is to be carried out later is transmitted to the first to N-th channel drivers 1201 to 1203, in step 3501.

Figure 12A:
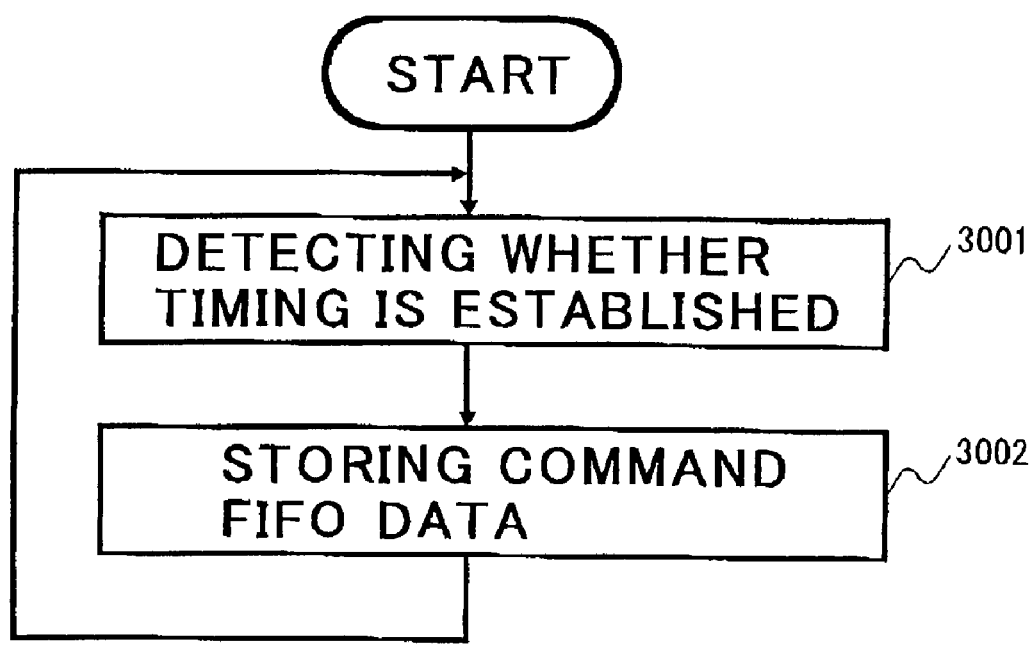
FIG. 12A is a flow chart showing a process of transmitting a signal in advance.
Figure 12B:
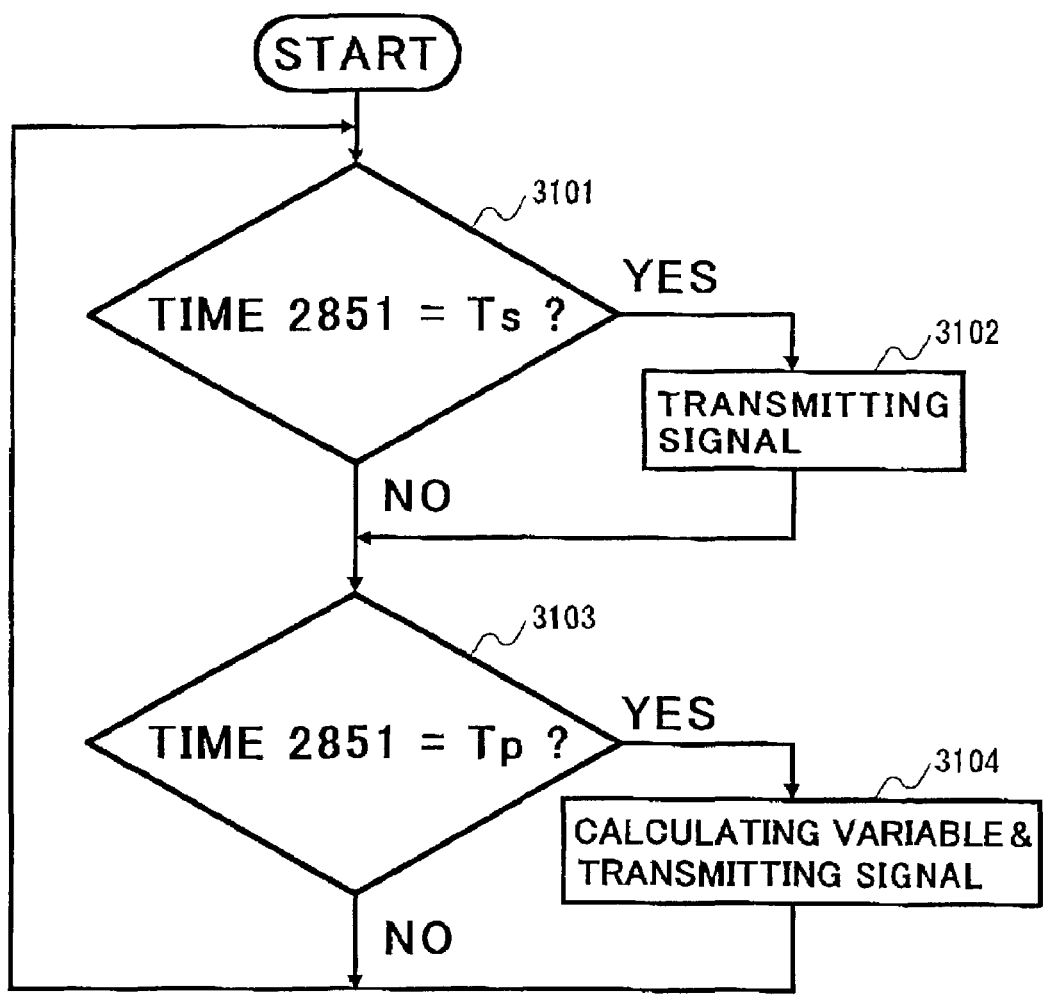
FIG. 12B is a flow chart showing a process of transmitting a signal in advance.

The step 3501 is carried out in accordance with steps illustrated in FIGS. 12A and 12B. The steps illustrated in FIG. 12A are carried out by the controllers 1012 to 1014, and the steps illustrated in FIG. 12B are carried out by the command processor 1017 and the signal transmission controller 1018.

With reference to FIG. 12A, the time-linkage timing controller 1012, the event-variable linkage timing controller 1013 and the schedule-linkage timing controller 1014 detect whether a timing in the timing-describing object 2300 included in the timing list 2200 of the schedule data 2100 stored in the schedule data memory 1021, is established, in step 3001.

Detecting that a timing is established, the time-linkage timing controller 1012, the event-variable linkage timing controller 1013 and the schedule-linkage timing controller 1014 produce the command FIFO data 2850, and stores the thus produced command FIFO data 2850 in the command FIFO matrix memory 1024, in step 3002.

In the above-mentioned way, a command of a schedule in which a timing has been established is successively stored into the command FIFO matrix memory 1024.

With reference to FIG. 12B, the command FIFO matrix memory 1024 compares the time 2851 included in the command FIFO data 2850, to a time Ts at which the signal is to be carried out, to thereby detect the command FIFO data 2850, in step 3101.

After the command FIFO matrix memory 1024 detected the command FIFO data 2850, the command FIFO matrix memory 1024 instructs the signal transmission controller 1018 to transmit the signal. The signal transmission controller 1018 produces the signal 2800, and transmits the signal 2800 to a designated channel driver among the first to N-th channel drivers 1201 to 1203, in step 3102.

As mentioned above, the signal 2800 is transmitted to the first to N-th channel drivers 1201 to 1203 in advance of a difference between a present time and a time at which the signal 2800 is to be carried out.

The command FIFO matrix memory 1024 compares the time 2851 included in the command FIFO data 2850, to a present time Tp, in step 3103, to thereby detect both the command FIFO data 2850 which could not be transmitted due to time tightness, and the command FIFO data 2850 having the equation 2541 used for calculating a variable.

If the command FIFO matrix memory 1024 detects the command FIFO data 2850, the signal transmission controller 1018 causes the command processor 1017 to carry out the equation 2541 with respect to the command FIFO data 2850 having the equation 2541, and to transmit a signal produced by the signal transmission-controller 1018, to the associated channel driver 1201 to 1203, in step 3104.

Thus, it is possible to transmit a signal which could not be transmitted due to time tightness, to the associated channel driver 1201 to 1203, and to carry out a command having the equation 2541 at a present time.

Referring back to FIG. 11, the signal 2800 is carried out at the time 2804 in the first to N-th channel drivers 1201 to 1203. The results of carrying out the signal 2800 are transmitted to the signal transmission controller 1018 from the first to N-th channel drivers 1201 to 1203, in step 3502. On receipt of the results, the signal transmission controller 1018 stores the received results in the result 2550 included in the command-describing object 2852 of the associated command FIFO data 2850, in step 3503.

The results are grouped into normal results including "starting carrying out the signal" and "finishing carrying out the signal", and abnormal results including "no corresponding signal identifier", "communication error" and "error in carrying out the signal". A normal result may reach the signal transmission controller 1018 twice, specifically, before the signal is carried out and after the signal has been carried out.

Figure 13:
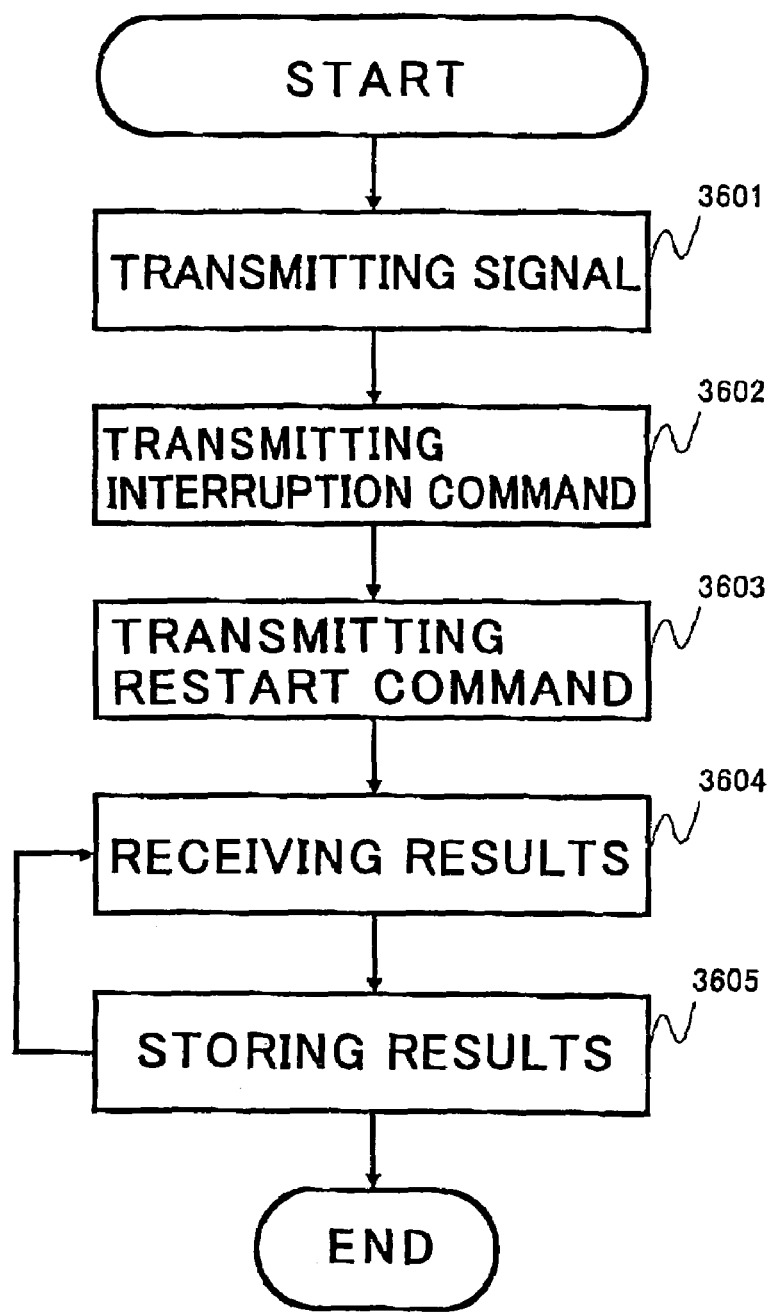
FIG. 13 is a flow chart showing a process of transmitting a signal in advance, including the step of transmitting an interruption command.

FIG. 13 is a flow chart of a process of transmitting the signal 2800 with interruption.

It is assumed that there occurs some reason for interrupting a schedule, after the signal 2800 was transmitted to the first to N-th channel drivers 1201 to 1203, in step 3601.

An interruption command is transmitted to the first to N-th channel drivers 1201 to 1203, in step 3602. As a result, a schedule relating to the schedule holder 2000 of the synchronization control server 1000 is interrupted, and in addition, the signal transmitted to the first to N-th channel drivers 1201 to 1203 is interrupted to be carried out.

When the reason for interrupting a schedule is removed, a restart command accompanied with a stand-by time is transmitted to the first-to N-th channel drivers 1201 to 1203 from the synchronization control server 1000, in step 3603.

On receipt of the restart command, the first to N-th channel drivers 1201 to 1203 restarts carrying out the signal 2800, delaying a time at which the signal 2800 is to be carried out, by the indicated stand-by time. The synchronization control server 1000 restarts carrying out a schedule relating to the schedule holder 2000.

Then, the results of carrying out the signal 2800 are transmitted to the signal transmission controller 1018 from the first to N-th channel drivers 1201 to 1203, in step 3604. On receipt of the results, the signal transmission controller 1018 stores the received results in the result 2550 included in the command-describing object 2852 of the associated command FIFO data 2850, in step 3605.

Figure 14:
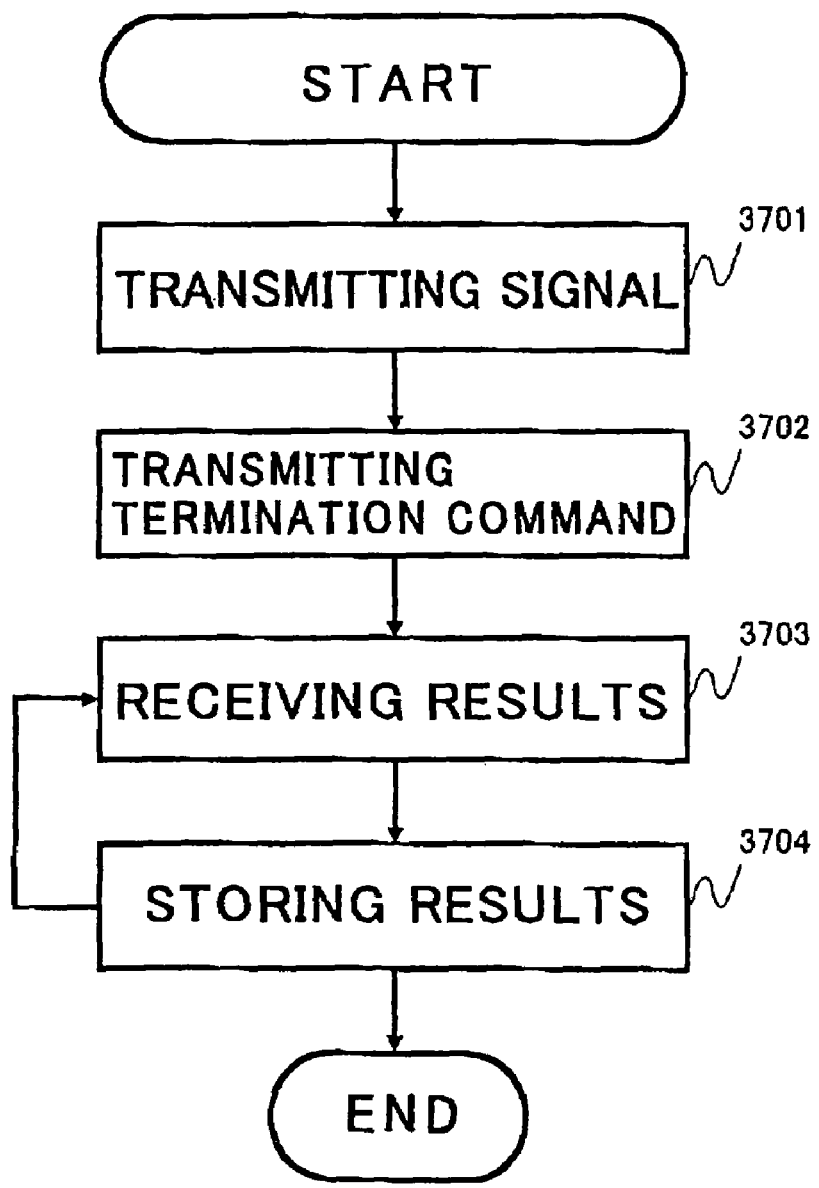
FIG. 14 is a flow chart showing a process of transmitting a signal in advance, including the step of transmitting a termination command.

FIG. 14 is a flow chart of a process of transmitting the signal 2800 with termination.

It is assumed that there occurs some reason for terminating a schedule, after the signal 2800 was transmitted to the first to N-th channel drivers 1201 to 1203, in step 3701.

A termination command is transmitted to the first to N-th channel drivers 1201 to 1203, in step 3702. As a result, a schedule relating to the schedule holder 2000 of the synchronization control server 1000 is stopped, and in addition, the signals transmitted to the first to N-th channel drivers 1201 to 1203 are all removed.

However, some signals 2800 may have been carried out before removed. The first to N-th channel drivers 1201 to 1203 notifies the signal transmission controller 1018 of such signals 2800. After the notification is received at the signal transmission controller 1018 in step 3708, it is stored in the result 2550.

Hereinbelow are explained some examples of the above-mentioned first embodiment.

[FIRST EXAMPLE]

In the first example, a schedule which is to be carried out by an event is carried out to thereby carry out other schedules in other channels. Herein, an event is defined as a result of carrying out a schedule linking to a time.

The schedule holder 2000 includes both the schedule data 2100 of a channel A (the first channel driver 1201) and the schedule data 2100 of a channel B (the second channel driver 1202). By designing the schedule holder 2000 to include schedule data of a plurality of channels, it would be possible to accomplish a channel-linking schedule.

Figure 15:
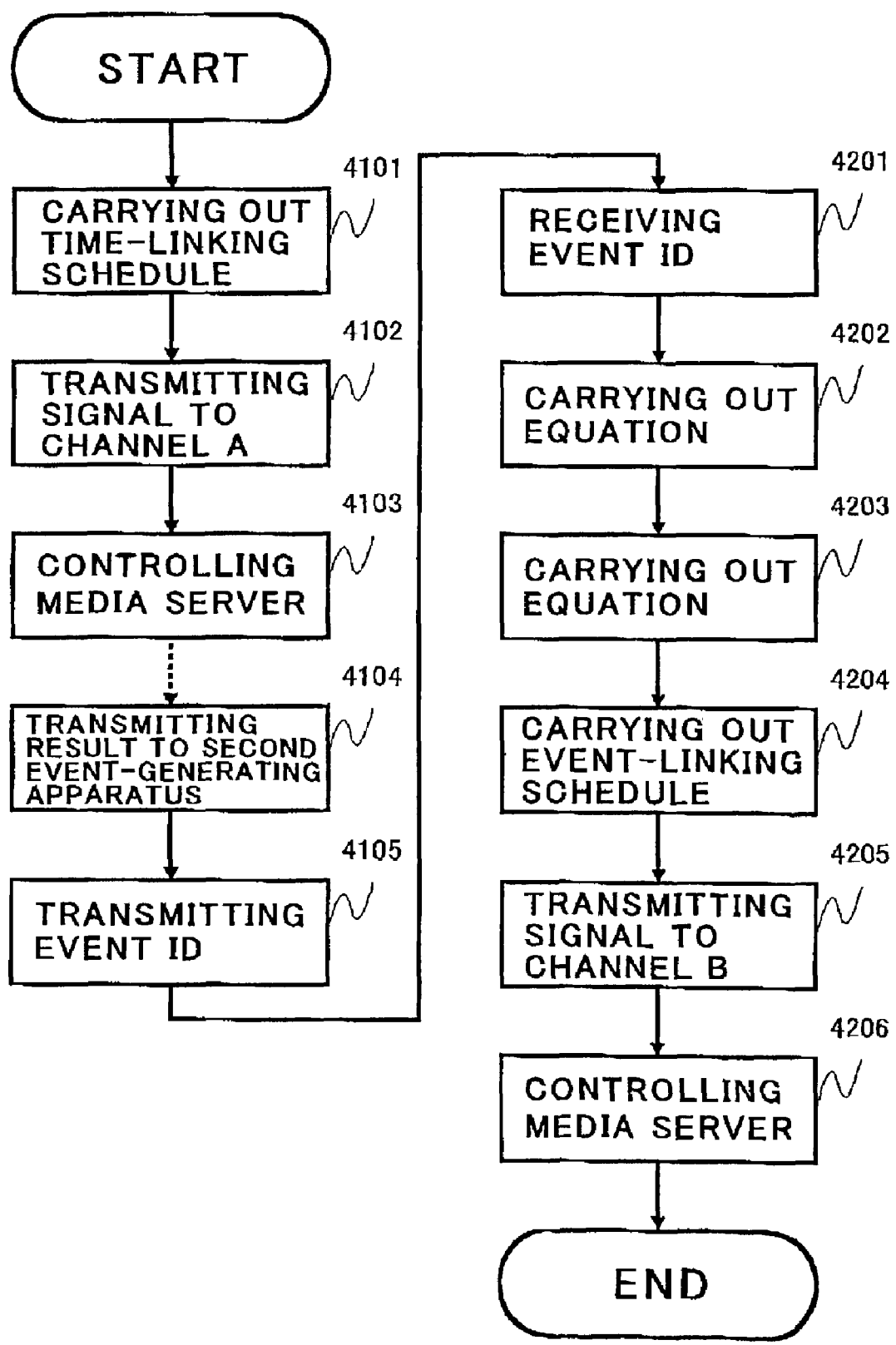
FIG. 15 is a flow chart showing a process to be carried out in the first example.

FIG. 15 is a flow chart of an operation of the first example.

A schedule linking to a time is carried out for the channel A, in step 4101.

Then, the signal 2800 is transmitted to the first channel driver 1201 for the channel A, in step 4102.

Then, the first channel driver 1201 controls the first media server 1301 to thereby carry out some action, in step 4103.

Either a result of the action or a result of another action derived from the action is transmitted to the second event-generating apparatus 1102 from the first channel driver 1201, in step 4104.

Then, the second event-generating apparatus 1102 produces a predetermined event identifier, and transmits it to the synchronization control server 1000, in step 4015. The thus produced event identifier is identical with an event identifier included in the event-processing data 2700 stored in the schedule holder 2000.

The event receiver 1016 in the synchronization control server 1000 receives the event identifier in step 4201.

Then, the equation 2720 for calculating a variable, included in the event-processing data 2700, is carried out, in step 4202. A variable used in the, calculation has a title X and an initial value of zero (0). Assuming that the equation 2720 is defined as $X=X+1$, the variable 2630 is equal to 1, that is, X is equal to 1 ($X=1$).

Since the variable 2630 included in the variable data 2600 is varied, the event-variable linkage timing controller 1013 carries out the equation for evaluating a variable, in step 4203. The equation to be carried out in step 4203 is the equation 2331 included in the timing data 2330, though the timing type 2320 in the timing-describing object 2300 indicates an equation for evaluating a variable. If the equation 2331 was defined as $X>0$, the equation 2331 has been just established just when the step 4201 has been carried out.

A schedule linking to an event is carried out in step 4204. Assuming that the command-describing object 2500 in the schedule describes the signal-describing data 2542 indicating the second channel driver 1202, the signal 2800 is transmitted to the second channel driver 1202 in step 4205, and then, the second channel driver 1202 controls the second media server 1302 in step 4206.

[SECOND EXAMPLE]

In the second example, the equation for evaluating a variable is defined as $X>1$ unlike the first example where the equation is defined as $X>0$.

Accordingly, when the event receiver 1016 in the synchronization control server 1000 receives the event identifier in step 4201 in FIG. 15, the variable X is equal to one ($X=1$), and hence, a schedule is not carried out. If the event receiver 1016 receives the same event identifier twice, the variable X is equal to two ($X=2$), and hence, a schedule is carried out.

In the second example, a variable is used as a medium to an event, indicating that it is possible to carry out an event-inking schedule by means of a combination of events.

[THIRD EXAMPLE]

In the third example, the equation for evaluating a variable is defined as $X>0$ and $Y>0$ unlike the first example where the equation is defined as $X>0$. Hence, if both X and Y are greater than zero ($X>0, Y>0$), the equation is established.

For a variable Y, an equation defined as $Y=Y+1$ is arranged in another event-processing data 2720. This equation is driven by a certain event identifier transmitted from the first event-generating apparatus 1101.

Accordingly, when an event identifier transmitted from the second event-generating apparatus 1102, based on data transmitted from the first channel driver 1201, and an event identifier transmitted from the first event-generating apparatus 1101 are both received, a schedule in the second event-generating apparatus 1102 is carried out. Thus, it is possible to control receipt of two events in synchronization.

[FOURTH EXAMPLE]

In the fourth example, the equation for evaluating a variable is defined as $X>0$ and $Y<0$ unlike the third example where the equation is defined as $X>0$ and $Y>0$. Hence, after the first event-generating apparatus 1101 transmits an event identifier, establishment of an equation for evaluating a variable is prohibited. Thus, the first event-generating apparatus 1101 acts as a stopper, which ensures that a stopper can be accomplished without changing structures of the first channel driver 1201 and the second event-generating apparatus 1102.

[FIFTH EMBODIMENT]

Figure 16:
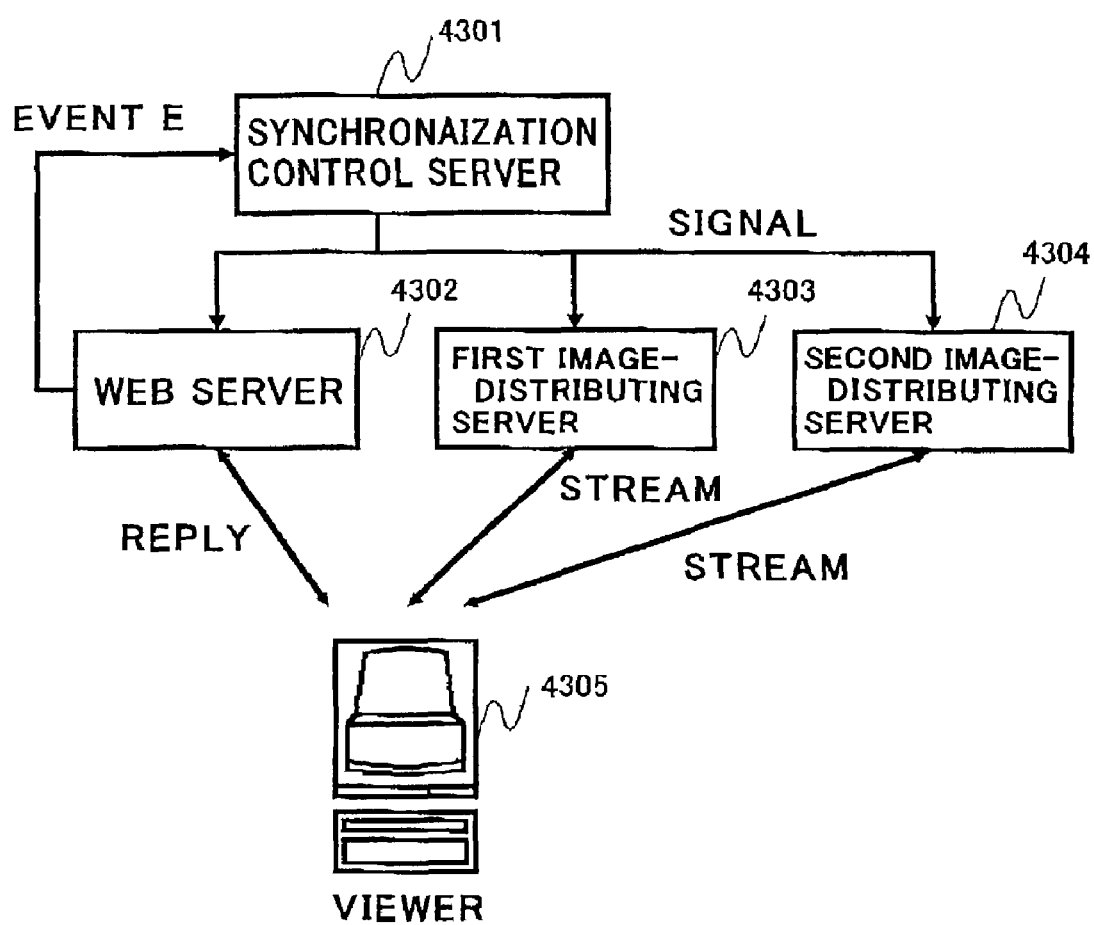
FIG. 16 is a block diagram of the fifth example.

FIG. 16 is a block diagram of a system in accordance with the fifth example.

A synchronization control server 4301 has the same structure as that of the synchronization control server 1000 illustrated in FIG. 8, and is designed to include first and second event-generating apparatuses corresponding to the first and second event-generating apparatuses 1101 and 1102.

Each of a web server 4302, a first image-distributing server 4303 and a second image-distributing server 4304 includes a channel driver and a media server.

The synchronization control server 4301 controls the web server 4302, the first image-distributing server 4303 and the second image-distributing server 4304 such that they are in synchronization with one another. A plurality of viewers 4305 looks at or listens to media data transmitted from the web server 4302, the first image-distributing server 4303 and the second image-distributing server 4304.

Figure 17:
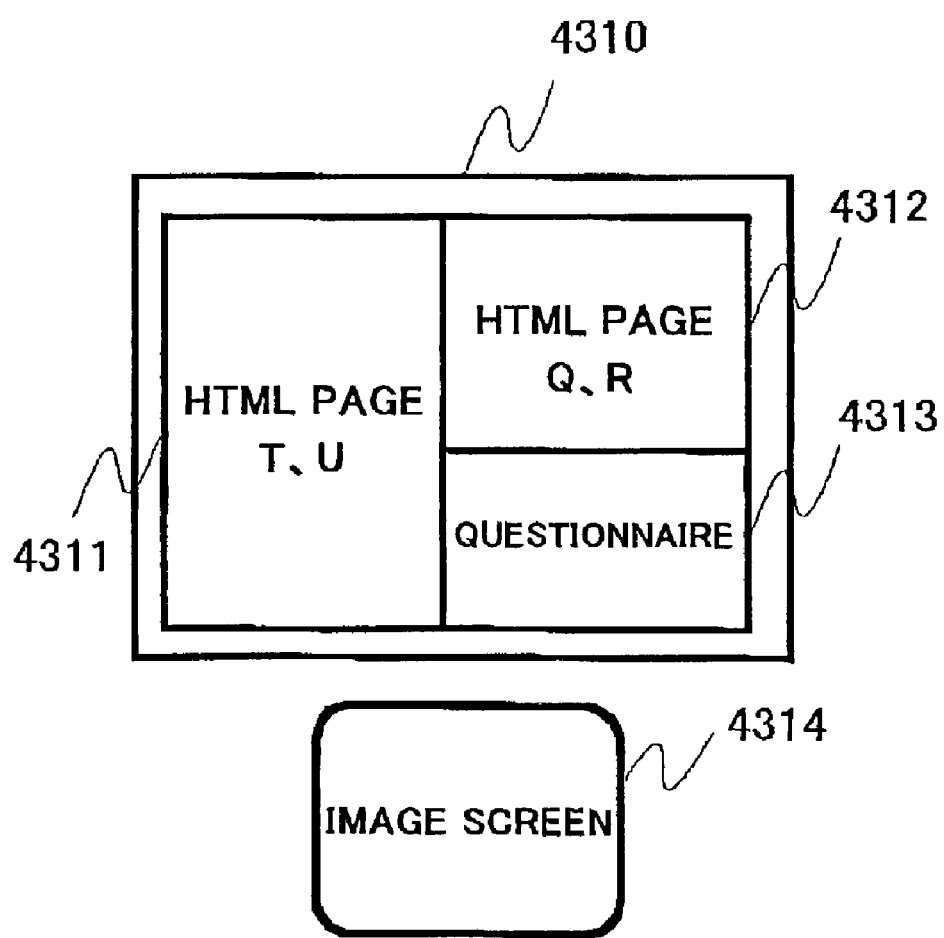
FIG. 17 illustrates an example of a screen of a viewer in the fifth example.

FIG. 17 illustrates an example of a display screen at the viewer 4305.

An image screen 4314 displays images transmitted from the first and second image-distributing servers 4303 and 4304. A web browser 4310 displays images transmitted from the web server 4302. The web browser 4310 in the fifth example is comprised of a first pane 4311 to display total information, a second pane 4312 to display information about the image screen, and a third pane 4313 to carry out an action made by a user.

In the fifth example, the synchronization control server 4301 switches what is displayed in the image screen 4314. The image screen 4314 may be included in the web browser 4310, or may be displayed in an external browser. As an alternative, the web browser 4310 may be displayed in a television screen.

The web server 4302 is designed to have functions of requesting issue of an event E if a questionnaire reaches a thousand, and requesting issue of an event F if a reply YES is major among thousand replies to the questionnaire.

The viewers 4305 watch images transmitted from the first and second image-distributing servers 4303 and 4304, and further watch HTML pages on the web server 4302 through the web browser 4310. In addition, the viewers 4305 make a reply to a questionnaire through the web browser 4310.

The synchronization control server 4301 stores therein schedule data 4321, 4322, 4323, 4324 and 4325 illustrated in FIG. 18. Based on the schedule data 4321, 4322, 4323, 4324 and 4325, a following schedule is carried out.

At p.m. 0:00, the web server 4302 transmits a HTML page T on which total information about programs is described, to the first pane 4311, and the total information is displayed on the image screen 4314, in accordance with the schedule data 4321.

At p.m. 1:00, the web server 4302 transmits a HTML page Q on which a method of referring to an image Q is described, to the second pane 4312, and the method is displayed on the image screen 4314, in accordance with the schedule data 4322. At the same time, the first image-distributing server 4303 starts distributing the image Q. The viewers 4305 can watch the image Q transmitted from the first image-distributing server 4303, on the image screen 4314, in accordance with the method described on the HTML page Q.

At p.m. 2:00, the web server 4302 transmits a questionnaire about the image Q to the second pane 4312, and questionnaire is displayed on the image screen 4314. Thus, the questionnaire starts. The schedule data 4324 for displaying the questionnaire is a logical sum (OR) of occurrence of the event E and p.m. 3:00 as a termination timing.

The web server 4302 requests issue of the event E, when a reply to the questionnaire reached a thousand. Hence, when a reply to the questionnaire reached a thousand, the event E is transmitted to the synchronization control server 1000. Accordingly, displaying the questionnaire by means of the schedule data 4324 ends whichever earlier when a reply to the questionnaire reached a thousand and the event E is issued, and when it is p.m. 3:00.

At p.m. 2:57, the web server 4302 finishes displaying the HTML page Q in accordance with the schedule data 4322, and hence, does not receive a reply to the questionnaire any longer.

At p.m. 3:00, the first image-distributing server 4303 finishes distributing the image Q in accordance with the schedule data 4322.

At the same time, the web server 4302 transmits a HTML page R on which a method of referring to an image R is described, to the second pane 4312, and the method is displayed on the image screen 4314, in accordance with the schedule data 4323. Concurrently, the second image-distributing server 4304 starts distributing the image R. The viewers 4305 can watch the image R 5 transmitted from the second image-distributing server 4304, on the image screen 4314, in accordance with the method described on the HTML page R.

In accordance with the schedule data 4324, the web server 4302 finishes displaying the questionnaire on the image screen 4314, if the event E is not issued yet, that is, even if a reply to the questionnaire does not reach a thousand.

At p.m. 4:57, the web server 4302 finishes displaying the HTML page R in accordance with the schedule data 4023, and hence, does not receive a reply to the questionnaire any longer.

At p.m. 5:00, the second image-distributing server 4304 finishes distributing the image R in accordance with the schedule data 4323.

The schedule data 4325 is expresses as a logical product (AND) of the event F and a time of p.m. 5:00. Hence, when both of the event F and a time of p.m. 5:00 are established, the first image-distributing server 4303 starts distributing an image S.

The event F indicates that a reply YES is major among replies to the questionnaire. If a reply YES is major, an image F is provided to the image screen 4314.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

For instance, the timing-describing object 2300 may include another timing-describing object 2300 in nest structure. For instance, the timing-describing object 2300 may include a plurality of pairs of the timing-describing objects 2300 each including a start timing and a termination timing.

When the timing-describing object 2300 has a nest structure, a parent object includes a plurality of children objects.

Hence, conditions for establishment of a timing in a parent object may be comprised of a logical product or a logical sum of establishment of a timing of each of children objects.

Though the distribution information schedule includes a single schedule holder 2000 in the above-mentioned embodiment, the distribution information schedule may include a plurality of the schedule holders 2000, in which case, termination, interruption or restart of a schedule is carried out for each of the schedule holders.

The entire disclosure of Japanese Patent Application No. 2001-332606 filed on Oct. 30, 2001 including specification, claims, drawings and summary is incorporated herein by reference in its entirety.

What is claimed is:

1. A server for carrying out synchronization control, comprising:
   (a) at least one event receiver for receiving an event at said server from external systems and channel drivers via a network;
   (b) a memory storing therein distribution schedule information including a plurality of schedule data therein, each of said schedule data including (b1) a timing at which one channel driver of said channel drivers controls a media server, (b2) a content of how said channel driver controls said media server, and (b3) a timing type indicating which one of a time and said event said timing is defined by; and
   (c) a controller which detects whether the timing is established for each of said schedule data included in said distribution schedule information, and transmits a signal to said channel driver, said signal being indicative of a control associated with the established timing, wherein each of said schedule data includes:
   at least one timing-describing section including data indicative of the timing at which said channel driver controls said media server; and
   at least one command-describing section including data indicating said content of how said channel driver controls said media server,
   said timing-describing section including:
   a timing type section indicative of which one of the time and the event the timing is defined by; and
   a timing data section including, if the timing is defined by the time, the time, and if the timing is defined by the event, conditions in accordance with which said timing is established,
   said controller including:
   (c1) a first timing-controller which detects whether the timing is established in said timing-describing section indicating that the timing is defined by the time;
   (c2) a second timing-controller which detects whether the timing is established in said timing-describing section indicating that the timing is defined by the event; and
   (c3) a distribution controller which produces the signal in accordance with a command-describing section of the at least one command-describing sections associated with said timing-describing section indicating that the timing has been established and which is stored in a queue, and transmits said signal to said channel driver through the network, wherein
   said timing-describing section includes an operation-point item indicative of a start of a schedule, an end of the schedule or the timing at which an action is to be carried out,
   said command-describing section includes an action-point item indicative of the start of the schedule, the end of the schedule or the timing at which the action is to be carried out, and
   said controller processes all of command-describing sections including said action-point item having the same content as that of said operation-point item of said timing-describing section indicating that the timing has been established, among command-describing sections included in schedule data, when the timing is established in said timing-describing section in the schedule data.

2. The server as set forth in claim 1, wherein said timing-describing section includes an item for determining a first delay time by which establishment of the timing is delayed.

3. The server as set forth in claim 1, wherein said command-describing section includes an item for determining a second delay time by which production of said signal is delayed.

4. The server as set forth in claim 3, wherein said controller (a) adds said second delay time to the time at which the timing is established, (b) applies a first time resulted from the addition to a command-describing section of said at least one command-describing sections associated with said timing-describing section indicating that the timing has been established; and (c) stores said command-describing section in said queue, and
   said distribution controller transmits a signal to said channel driver at a certain time before said first time having been applied to said command-describing section, said signal being indicative of said first time.

5. The server as set forth in claim 4, wherein said distribution controller applies an identifier to said signal for identifying said signal only, and, when instructed of termination, interruption or restart of schedule, transmits a command indicative of termination, interruption or restart of said signal to said channel driver by designating said identifier of said signal.

6. The server as set forth in claim 1, wherein said memory stores (a) variable data including a title of said variables, an initial value, and a variation value, and (b) event-processing data including an identifier of an event and the predetermined equation for operating variables, and
   said event receiver carries out said predetermined equation for the operating variables in said event-processing data having an identifier identical with the identifier of the received event, to thereby update said variation value in said variable data.

7. The server as set forth in claim 1, wherein said memory stores variable data including a title of said variables, an initial value, and a variation value,
   said distribution schedule information includes schedule data having one of the at least one command-describing sections describing the predetermined equation for operating variables to update the variation value of said variable data, and
   said server further comprising a command-processor which carries out the command-describing section describing said equation for operating variables, in response to establishment of the timing in said timing-describing section associated with said one command-describing section.

8. A server for carrying out synchronization control, said server comprising:

(a) at least one event receiver for receiving an event at said server from external systems and channel drivers via a network;
(b) a memory storing therein distribution schedule information including a plurality of schedule data therein, each of said schedule data including (bi) a first timing at which one channel driver of said channel drivers controls a media server, (b2) a content of how said channel driver controls said media server, and (b3) a timing type indicating which one of a time, said event, and establishment of an established timing in other schedules said first timing is defined by; and
(c) a controller which detects whether the established timing is established for each of said schedule data included in said distribution schedule information, and transmits a signal to said channel driver, said signal being indicative of a control associated with the established timing,
wherein each of said schedule data includes:
at least one timing-describing section including data indicative of the first timing at which said channel driver controls said media server; and
at least one command-describing section including data indicating said content of how said channel driver controls said media server,
said timing-describing section including:
a timing type section indicative of which one of the time, the event, and establishment of another timing in other timing-describing section the first timing is defined by; and
a timing data section including, if the first timing is defined by the time, the time, if the first timing is defined by the event, conditions in accordance with which said first timing is established, and if the first timing is defined by establishment of the other timing in the other timing-describing section, data identifying said other timing-describing section,
wherein said controller includes:
(c1) a first timing-controller which detects whether the first timing is established in said timing-describing section indicating that the first timing is defined by the time;
(c2) a second timing-controller which detects whether the first timing is established in said timing-describing section indicating that the first timing is defined by the event;
(c3) a third timing-controller which detects whether the first timing is established in said timing-describing section indicating that the first timing is defined by establishment of the other timing in the other timing-describing section; and
(c4) a distribution controller which produces the signal in accordance with the at least one command-describing section associated with the timing-describing section indicating that the first timing has been established and which is stored in a queue, and transmits said signal to said channel driver through a the network, wherein said timing-describing section includes an operation-point item indicative of a start of a schedule, an end of the schedule or the first timing at which an action is to be carried out,
said command-describing section includes an action-point item indicative of the start of the schedule, the end of the schedule or the first timing at which the action is to be carried out,
said controller processes all of command-describing sections including said action-point item having the same content as that of said operation-point item of said timing-describing section indicating that the first timing has been established, among command-describing sections included in schedule data, when the first timing is established in the timing-describing section in the schedule data.

9. The server as set forth in claim 8, wherein said timing-describing section includes an item for determining a first delay time by which establishment of the timing is delayed.

10. The server as set forth in claim 8, wherein said command-describing section includes an item for determining a second delay time by which production of said signal is delayed.

11. The server as set forth in claim 10, wherein said controller (a) adds said second delay time to the time at which the first timing is established, (b) applies a first time resulted from the addition to the command-describing section associated with the timing-describing section indicating that the first timing has been established, and (c) stores said command-describing section in said queue, and
said distribution controller transmits a signal to said channel driver at a certain time before said first time having been applied to said command-describing section, said signal being indicative of said first time.

12. The server as set forth in claim 11, wherein said distribution controller applies an identifier to said signal for identifying said signal only, and, when instructed of termination, interruption or restart of schedule, transmits a command indicative of termination, interruption or restart of said signal to said channel driver by designating said identifier of said signal.

13. The server as set forth in claim 8, wherein said conditions are comprised of an equation for evaluating variables which are one of factors by which the first timing is established, said equation including variables which are varied according to a predetermined equation for operating variables, when said event occurs,
wherein said memory stores (a) variable data including a title of said variables, an initial value, and a value after varied, and (b) event-processing data including an event identifier of the event and the predetermined equation for operating variables, and
said event receiver carries out said equation for operating variable in said event-processing data having said event identifier identical with a received identifier of a received event, to thereby update said value after varied in said variable data.

14. The server as set forth in claim 8, wherein said memory stores variable data including a title of said variables, an initial value, and a variation value,
said distribution schedule information includes schedule data having the at least one command-describing section describing the predetermined equation for operating variables to update the variation value of said variable data, and
said server further comprising a command-processor carries out one of said at least one command-describing section describing said equation for operating variables, in response to establishment of the timing in the at least one timing-describing section associated with said command-describing section.

15. A channel driver comprising:
(a) a memory storing a signal transmitted from a synchronization control server through a network, said synchronization control server controlling an operation of each of a plurality of media servers which distribute contents in accordance with distribution schedule information including schedule data defining a control timing with a specified time or an event received at said synchronization control server from external systems and channel drivers via a network, said signal including a control carried out by a media server of the plurality of media servers, a second time at which said media servers carry out said control, and identifiers identifying said media servers; and (b) a driver unit of said channel driver which detects a detected signal indicating that it is time to start said control, and causes a media server controller to carry out said control in accordance with the detected signal, wherein said driver unit, on receipt of a command of terminating or interrupting a signal identified with a designated identifier of the identifiers identifying said media servers, from said synchronization control server through the network, terminates or interrupts an indication signal identified with said designated identifier, wherein said driver, on receipt of a command of restarting the signal identified with the designated identifier and indicative of a delay time from said synchronization control server through the network after receiving the command of interrupting said signal from said synchronization control server, releases interruption of said signal with delaying the time at which said signal is to be carried out, by said delay time.

16. A processor-readable tangible medium incorporating a program of instructions configured to cause a computer to act as a synchronization server for carrying out synchronization control, said server comprising:

(a) at least one event receiver for receiving an event at said computer from external systems and channel drivers via a network;

(b) a memory storing therein distribution schedule information including a plurality of schedule data therein, each of said schedule data including (b1) a timing at which a one channel driver of said channel drivers controls a media server, (b2) a content of how said channel driver controls said media server, and (b3) a timing type indicating which one of a time and said event said timing is defined by; and (c) a controller which detects whether the timing is established for each of said schedule data included in said distribution schedule information, and transmits a signal to said channel driver, said signal being indicative of a control associated with the established timing, wherein each of said schedule data includes:

at least one timing-describing section including data indicative of the timing a which said channel driver controls said media server; and at least one command-describing section including data indicating said content of how said channel driver controls said media server, said timing-describing section including:

a timing type section indicative of which one of the time and the event the timing is defined by; and a timing data section including, if the timing is defined by the time, the time, and if the timing is defined by the event, conditions in accordance with which said timing is established, wherein said controller includes:

(ci) a first timing-controller which detects whether the timing is established in said timing-describing section indicating that the timing is defined by the time;

(c2) a second timing-controller which detects whether the timing is established in said timing-describing section indicating that the timing is defined by the event; and (c3) a distribution controller which produces the signal in accordance with a command-describing section of said at least one command-describing section associated with said timing-describing section indicating that the timing has been established and which is stored in a queue, and transmits said signal to said channel driver through said network, wherein said timing-describing section includes an operation-point item indicative of a start of a schedule, an end of the schedule or the timing at which an action is to be carried out, said command-describing section includes an action-point item indicative of the start of the schedule, the end of the schedule or the timing at which the action is to be carried out, said controller processes all of command-describing sections including said action-point item having the same content as that of said operation-point item of said timing-describing section indicating that the timing has been established, among command-describing sections included in schedule data, when the timing is established in said timing-describing section in the schedule data.

17. The medium as set forth in claim 16, wherein said timing-describing section includes an item for determining a first delay time by which establishment of the timing is delayed.

18. The medium as set forth in claim 16, wherein said command-describing section includes an item for determining a second delay time by which production of said signal is delayed.

19. The medium as set forth in claim 18, wherein said controller (a) adds said second delay time to the time at which the timing is established, (b) applies a first time resulted from the addition to said command-describing section associated with the timing-describing section indicating that the timing has been established and (c) stores said command-describing section in said queue, and said distribution controller transmits a signal to said channel driver at a certain time before said first time having been applied to said command-describing section, said signal being indicative of said first time.

20. The medium as set forth in claim 19, wherein said distribution controller applies an identifier to said signal for identifying said signal only, and, when instructed of termination, interruption or restart of schedule, transmits a command indicative of termination, interruption or restart of said signal to said channel driver by designating said identifier of said signal.

21. The medium as set forth in claim 16, wherein said conditions are comprised of an equation for evaluating variables which are one of factors by which the timing is established, said equation including variables which are varied by a predetermined equation for operating variables, when said event occurs, wherein said memory stores: (a) variable data including a title of said variables, an initial value, and a variation value, and (b) event-processing data including an identifier of an event and the predetermined equation for operating variables, and said event receiver carries out said equation for operating variable in said event-processing data having the identifier identical with the identifier of the event received, to thereby update said variation value in said variable data.

22. The medium as set forth in claim 16, wherein said memory stores variable data including a title of said variables, an initial value, and a variation value, said distribution schedule information includes schedule data having a command-describing section of the at least one command-describing section describing the predetermined equation for operating variables to update the variation value of said variable data, and said server further comprising a command-processor carries out one of said at least one command-describing section describing said predetermined equation for operating variables, in response to establishment of the timing in a timing-describing section of the at least one timing-describing section associated with said command-describing section.

23. A processor-readable tangible medium incorporating a program of instructions configured to cause a computer to act as a synchronization server for carrying out synchronization control, said server comprising:

(a) at least one event receiver for receiving an event at said computer from external systems and channel drivers via a network;

(b) a memory storing therein distribution schedule information including a plurality of schedule data therein, each of said schedule data including: (b1) a first timing at which one channel driver of said channel drivers controls a media server, (b2) a content of how said channel driver controls said media server, and (b3) a timing type indicating which one of a time, said event, and establishment of an established timing in other schedules said first timing is defined by; and (c) a controller which detects whether the first timing is established for each of said schedule data included in said distribution schedule information, and transmits a signal to said channel driver, said signal being indicative of a control associated with the established timing, wherein each of said schedule data includes:

at least one timing-describing section including data indicative of the timing at which said channel driver controls said media server; and at least one command-describing section including data indicating said content of how said channel driver controls said media server, said timing-describing section including:

a timing type section indicative of which one of the time, the event, and establishment of the established timing in the other timing-describing section the first timing is defined by, and a timing data section including, if the first timing is defined by the time, the time, and if the first timing is defined by the event, conditions in accordance with which said first timing is established, and if the first timing is defined by establishment of the established timing in said other timing-describing section, data identifying said other timing-describing section, wherein said controller includes:

(c1) a first timing-controller which detects whether the first timing is established in said timing-describing section indicating that the first timing is defined by the time;

(c2) a second timing-controller which detects whether the first timing is established in said timing-describing section indicating that the first timing is defined by the event;

(c3) a third timing-controller which detects whether the first timing is established in said timing-describing section indicating that the first timing is defined by establishment of the established timing in said other timing-describing section; and (c4) a distribution controller which produces the signal in accordance with a command-describing section of the at least one command-describing section associated with a timing-describing section of the at least one timing-describing section indicating that the first timing has been established and which is stored in a queue, and transmits said signal to said channel driver through a the network, wherein said timing-describing section includes an operation-point item indicative of a start of a schedule, an end of the schedule or the first timing at which an action is to be carried out, said command-describing section includes an action-point item indicative of the start of the schedule, the end of the schedule or the first timing at which the action is to be carried out, said controller processes all of command-describing sections including said action-point item having the same content as that of said operation-point item of timing-description section of said at least one timing-describing section indicating that the first timing has been established, among command-describing sections included in schedule data, when the first timing is established in said timing-describing section in the schedule data.

24. The medium as set forth in claim 23, wherein said timing-describing section includes an item for determining a first delay time by which establishment of the first timing is delayed.

25. The medium as set forth in claim 23, wherein said command-describing section includes an item for determining a second delay time by which production of said signal is delayed.

26. The medium as set forth in claim 25, wherein said controller (a) adds said second delay time to the time at which the first timing is established, (b) applies a first time resulted from the addition to a command-describing section of the at least one command-describing section associated with a timing-describing section indicating that the first timing has been established, and (c) stores said command-describing section in said queue, and said distribution controller transmits said signal to said channel driver at a certain time before said first time having been applied to said command-describing section, said signal being indicative of said first time.

27. The medium as set forth in claim 26, wherein said distribution controller applies an identifier to said signal for identifying said signal only, and, when instructed of termination, interruption or restart of schedule, transmits a command indicative of termination, interruption or restart of said signal to said channel driver by designating said identifier of said signal.

28. The medium as set forth in claim 23, wherein said conditions are comprised of an equation for evaluating variables which are one of factors by which the first timing is established, said equation including variables which are varied by a predetermined equation for operating variables, when said event occurs, wherein said memory stores: (a) variable data including a title of said variables, an initial value, and a value after varied, and (b) event-processing data including an identifier of an event and the predetermined equation for operating variables, and said event receiver carries out said equation for operating variable in said event-processing data having the identifier identical with the identifier of the event received, to thereby update said value after varied in said variable data.

29. The medium as set forth in claim 23, wherein said memory stores variable data including a title of said variables, an initial value, and a variation value,
   said distribution schedule information includes schedule data having a command-describing section describing the predetermined equation for operating variables to update the variation value of said variable data, and
   said server further comprising a command-processor carries out said command-describing section describing said equation for operating variables, in response to establishment of the first timing in a timing-describing section of the at least one timing describing section associated with said at least one command-describing section.

* * * * *